(12) United States Patent     (10) Patent No.:    US 7,801,085 B1
Chen et al.     (45) Date of Patent:    Sep. 21, 2010

(54) SYSTEM AND METHOD OF PROCESSING CDMA SIGNALS

(75) Inventors: Xixian Chen, Nepean (CA); Woon Thong, Nepean (CA); Ganesh Sundararajan, Ottawa (CA); Edward Ken Kiu Mah, Nepean (CA); Karl Mann, Nepean (CA)

(73) Assignee: Ericsson AB, Stockholm (SE)

( * ) Notice: Subject to any disclaimer, the term of this patent is extended or adjusted under 35 U.S.C. 154(b) by 2208 days.

(21) Appl. No.: 10/452,585

(22) Filed: Jun. 3, 2003

Related U.S. Application Data

(60) Provisional application No. 60/385,033, filed on Jun. 3, 2002.

(51) Int. Cl.
    *H04B 7/216*     (2006.01)
    *H04B 1/00*     (2006.01)

(52) U.S. Cl. .................. 370/335; 370/342; 370/328; 375/148; 375/144

(58) Field of Classification Search ............... 370/328, 370/342, 335; 375/142, 144, 147–150
See application file for complete search history.

(56) References Cited

U.S. PATENT DOCUMENTS

| | | | | |
|---|---|---|---|---|
| 5,903,550 A * | 5/1999 | Spock | ............... | 370/335 |
| 6,269,075 B1 * | 7/2001 | Tran | ............... | 370/206 |
| 6,272,167 B1 * | 8/2001 | Ono | ............... | 375/144 |
| 6,466,565 B1 * | 10/2002 | Wax et al. | ............... | 370/342 |
| 6,650,694 B1 * | 11/2003 | Brown et al. | ............... | 375/150 |
| 6,731,622 B1 * | 5/2004 | Frank et al. | ............... | 370/342 |
| 6,795,488 B1 * | 9/2004 | Iwakiri | ............... | 375/148 |
| 6,829,290 B1 * | 12/2004 | Schmidl et al. | ............... | 375/147 |
| 6,834,074 B2 * | 12/2004 | Sriram et al. | ............... | 375/142 |
| 7,039,134 B1 * | 5/2006 | Avital et al. | ............... | 375/343 |
| 7,110,437 B2 * | 9/2006 | Oates et al. | ............... | 375/147 |
| 7,586,982 B2 * | 9/2009 | Nguyen et al. | ............... | 375/233 |
| 2002/0057730 A1 * | 5/2002 | Karlsson et al. | ............... | 375/152 |
| 2003/0002453 A1 * | 1/2003 | Tran et al. | ............... | 370/328 |
| 2008/0130674 A1 * | 6/2008 | Ahmed-Ouameur et al. | | 370/441 |

OTHER PUBLICATIONS

Keld Lange et al, "A Software Solution for Chip Rate Processing in CDMA Wireless Infratructure", IEEE Communications Magazine, Feb. 2002.*

* cited by examiner

*Primary Examiner*—Duc M Nguyen

(57) ABSTRACT

Methods and apparatus for performing finger de-spreading and MRC combining are provided. A large antenna buffer is used to buffer all the finger signals of the same user so that the receiver can do both de-spreading and MRC at the same time without buffering the de-spreading finger symbols. For each user, a reference time is introduced to align all the finger signals of the same user in the Antenna Buffer. The reference time delay is used to generate the PN codes for de-spreading, as well as to count the number of symbols in a PCG or a frame. Methods for antenna buffer arrangement, interpolating filter implementation, channel estimation and MRC for traffic data channels, timing for the user's finger signal de-spreading and MRC, long code and short code generation for de-spreading, new finger allocation and finger timing adjustment.

54 Claims, 10 Drawing Sheets

SYSTEM AND METHOD OF PROCESSING CDMA SIGNALS

RELATED APPLICATION

This application claims the benefit of Provisional Application No. 60/385,033 filed Jun. 3, 2002.

FIELD OF THE INVENTION

The invention relates to systems and methods of processing CDMA signals, for example de-spreading, channel estimation and MRC (maximum ratio combining) in a CDMA (code division multiple access) receiver.

BACKGROUND OF THE INVENTION

A CDMA receiver processes an incoming signal to identify several multi-path components of a transmission, and then combines these components in recovering the symbols. A very simplified view of a conventional CDMA receiver is presented in FIG. 1. A signal is received by antenna 10 and processed by filter 12 and A/D converter 14. The samples 15 output by the A/D converter are stored in a small antenna buffer 16.

There are a set of finger data de-spreaders 22, 24, ..., 26 (only three shown), one for each multi-path being tracked. The finger symbol de-spreading is done first in these finger de-spreaders 22, 24, ..., 26 and the results are stored in finger data symbol buffers 28, 30, ..., 32. Pilot de-spreading is stored in finger pilot symbol buffers 23,25,27 which are used by channel estimators 29,31,33 to generate channel estimates. An MRC combiner 36 takes its input from the finger symbol buffers 28, 30, ..., 32 and from the channel estimators 29,31,33 and outputs symbols 38. Similarly, user M symbols are shown being output at 40.

The design of FIG. 1 is not appropriate for multi-user reception because since separate finger symbol buffer storage space is required for each finger of each user, a large overall finger symbol buffer would be required if the number of users in one modem is large. Since the antenna buffer is small, the finger timing adjustment is difficult, and may result in degraded performance.

In the CDMA receiver of the base station, the time critical and computation intensive tasks are the users' finger de-spreading, channel estimation and maximum ratio combining (MRC). Any improvement in the efficiency of performing these tasks would be beneficial. For a given amount of hardware/software resources, an efficient architecture would produce increased finger processing capacity and lower cost per channel element. A main disadvantage of using a small front antenna buffer is the need for multiple buffers to store intermediate results, such as finger symbols, pilot symbols, etc., and the problem of transferring and processing large amounts of data between components.

SUMMARY OF THE INVENTION

Advantageously, because a single buffer is employed, with timing offsets such that processing for all users can be processed as soon as it arrives. There is no requirement to wait for a user having the greatest delay. Rather, the timing offsets are adjusted such that a user having a greater delay will be processed, but for a later symbol. Thus effectively the earlier users are processed earlier than the later users. If instead, the system waited until all users arrived to perform the processing, this would make it difficult to perform effective power control for all users.

Advantageously, the size of the antenna buffer does not need to be increased when the cell size gets larger. This is because only the delay spread for one user needs to be accommodated, and this is not effected by cell size. The delay spread in a large cell will be substantially the same as in a small cell. Again, this is because of the timing adjustments that are made during the processing for the users.

According to one broad aspect, the invention provides a method comprising: sampling a multi-user CDMA signal having a chip rate to produce samples and storing the sample in an antenna buffer; for each user and for each processing interval: performing channel estimation for a plurality of fingers as a function of samples stored in the antenna buffer to produce a channel estimate for each finger; performing de-spreading for each of the plurality of fingers as a function of samples stored in the antenna buffer to produce a respective de-spread finger symbol; combining the de-spread finger symbols as a function of the channel estimates; wherein the antenna buffer has a size selected to allow de-spreading while accommodating a delay spread between fingers of a single user and to perform channel estimation using future samples.

In some embodiments, the de-spread finger symbols are combined without buffering the de-spread finger symbols.

In some embodiments, the antenna buffer is a circular buffer updated every processing interval.

In some embodiments, the antenna buffer is comprised of a first field used to buffer the samples during a current processing interval; a second field used to align a symbol boundary of a user's latest finger so as to provide elasticity in user's finger timing adjustment; a third field to buffer input samples for doing channel estimation using the future samples; and a fourth field to accommodate the delay spread between a user's earliest finger and latest finger.

In some embodiments, the third field has a size in time equal to a separation in time between power control commands.

In some embodiments, the first field is 16-chips, the second field is 16 chips, the third field is 1536 chips and the fourth field is 352 chips.

In some embodiments, for each user: for each finger and for each processing interval: a) performing de-spreading for each finger as a function of samples stored in the antenna buffer to produce a respective de-spread finger symbol comprises reading samples from the antenna buffer from a respective data channel starting point to generate a de-spread data symbol; b) performing channel estimation for each finger as a function of samples stored in the antenna buffer to produce a channel estimate for the finger comprises reading samples from the antenna buffer from a respective pilot channel starting point to generate a de-spread pilot symbol, the pilot channel starting point being delayed from the data channel starting point by a predetermined amount such that the pilot channel starting point is in the future as compared to the data channel starting point, and generating a channel estimate as a function of de-spread pilot symbols generated for times before and after the respective data channel starting point; c) combining the de-spread finger symbols as a function of the channel estimates comprises multiplying the channel estimate by the de-spread data symbol to produce a scaled de-spread data symbol, and combining the scaled de-spread data symbol to produce a MRC combined symbol.

In some embodiments, the processing interval is 16 chips in duration.

In some embodiments, the multi-user CDMA signal is sampled at a sample rate at least twice the chip rate; for each of a plurality of fingers having a respective delay determined to a resolution finer than a duration between samples, performing an on-the-fly interpolation upon said samples to generate a selected one of a plurality of sample phases between the samples of the sampled CDMA signal, and using the selected sample phase for de-spreading and channel estimation.

In some embodiments, the sample rate is $2f_c$, where $f_c$ is the chip rate, and wherein interpolation is performed to generate one of four phases, thereby achieving an effective sample resolution of $f_c/8$.

In some embodiments, the method comprises employing a table look-up method to do the interpolation.

In some embodiments, the table look-up method comprises: using a plurality of consecutive samples to generate one interpolated sample.

In some embodiments, the method comprises: using four consecutive samples to generate one interpolated sample, with the nth interpolated sample is determined according to $$s(n,i) = \sum_{K=1}^{4} a_K^{(i)} s_K,$$

where $s_K$ is one of the four samples selected for interpolation (selected as a function of n), and i is the phase being calculated, the filter coefficients $a_K(i)$ being different depending on the phase being generated.

In some embodiments, the method further comprises: pre-computing all possible values of $V_1$ and $V_2$ in $s(n,i)=(a_1^{(i)}s_1+a_2^{(i)}s_2)+(a_3^{(i)}s_3+a_4^{(i)}s_4)$ and storing these in look-up tables, with two tables per phase.

In some embodiments, the method comprises; processing the first two samples of the four consecutive samples by a selected one of four look-up tables 1A, 1B, 1C 1D; processing the next two samples of the four consecutive samples by a selected one of four look-up tables 2A, 2B, 2C, 2D; combining the results from the two selected look-up tables to give the interpolated sample.

In some embodiments, the method comprises: reversing the order of the samples for odd phases; processing the first two samples of the four consecutive samples by a selected one of two look-up tables 1A, 1B; processing the next two samples of the four consecutive samples by a selected one of two look-up tables 2A, 2B; combining the results from the two selected look-up tables to give the interpolated sample.

In some embodiments, the method comprises: using L consecutive samples, L>=3, to generate one interpolated sample, with the nth interpolated sample is determined according to $$s(n,i) = \sum_{K=1}^{L} a_K^{(i)} s_K,$$

where $s_K$ is one of the L samples selected for interpolation (selected as a function of n), and i is the phase being calculated, the filter coefficients $a_K(i)$ being different depending on the phase being selected.

In some embodiments, the method further comprises: for at least two subsets of the L consecutive samples, determining all possible values of at least two subsets of sums of values of $a_K^{(i)} s_K$ to generate a respective look-up table per phase.

In some embodiments, the method further comprises: for at least two subsets of the L consecutive samples, determining all possible values of at least two subsets of sums of values of $a_K^{(i)} s_K$ to generate a respective look-up table for half the phases, using samples directly for half of the phases, and reversing the order of the samples for the other half of the phases.

In some embodiments, the method further comprises: maintaining a global system time, each finger of any user having a finger arrival time which is later than the system time by a respective finger delay; for each user defining a reference time delay which is larger than a largest finger delay for the user; defining for each user a respective reference time, the reference time being later than the system time by the reference time delay (reference time=system time+reference time delay); for each finger of each user defining a first time advance relative to the reference time to be the reference time delay minus the finger delay and using this to find a pilot symbol start position in the buffer for pilot channel de-spreading, which will be used for channel estimation; for each finger of each user defining a second time advance relative to the reference time to be the reference time delay minus the finger delay plus a processing delay and using this to find a traffic data symbol start position in the buffer for data channel de-spreading; wherein the reference time of all users is aligned with a common location in the antenna buffer.

In some embodiments, the method further comprises using the reference time delay to generate PN codes for de-spreading.

In some embodiments, the method further comprises using the reference time delay to count the number of symbols in a PCG (power control group) or a frame.

In some embodiments, the reference time delay is set to be a multiple of the processing interval.

In some embodiments, the processing interval is 16 chips.

In some embodiments, the reference time delay is set to be greater than a time difference between a latest finger arrival time and the global system time by at least a predetermined number of chips.

In some embodiments, the reference time delay is set to be greater than a time difference between a latest finger arrival time and the global system time by at least 1 chip.

In some embodiments, the method further comprises: for each user monitoring a difference between the reference time delay and a latest finger's arrival time and if the difference is less than a predetermined amount, delaying the reference time delay by the processing interval and updating the time advances of all the fingers associated with the new reference time delay by adding the processing interval to them.

In some embodiments, the method further comprises: at a next processing interval when the updates to the time advances take effect, producing a same symbol result as a previous symbol result, and either discarding the same symbol result or storing the same symbol result in a same memory location as the previous symbol result.

In some embodiments, the predetermined amount is 1 chip, the processing interval is 16 chips and the processing delay is 16-chips.

In some embodiments, the method further comprises: for each user when a difference between the reference time delay and a latest finger's delay is larger than a threshold for a period of time, advancing the reference time delay by the processing interval and updating the time advances of all the fingers associated with the new reference time delay by subtracting the processing interval from them.

In some embodiments, the method further comprises: at a next processing interval when the updates to the time advances take effect, producing two symbol results and store them in two consecutive memory locations, one symbol result being produced by using previous time advances and the other symbol result being produced by using new time advances.

In some embodiments, the predetermined amount is 1 chip, the processing interval is 16 chips and the processing delay is 16-chips.

In some embodiments, the method further comprises: performing combined finger de-spreading and MRC (maximum ratio combining) combining in a first processor to generate channel symbols and storing the channel symbols in a symbol buffer; reading symbols from the symbol buffer with a second processor using direct memory access and performing decoding on the symbols.

In some embodiments, the symbol buffer is implemented as a pair of buffers the each channel.

In some embodiments, the method system further comprises: for a selected buffer which alternates between the buffers of the pair of buffers, writing to the selected buffer with an offset address which compensates for a difference between system time and a reference time for the channel until the selected buffer is full; wherein reading symbols from the symbol buffer with a second processor using direct memory access and performing decoding on the symbols is done using the buffer of the pair of buffers other than the selected buffer.

In some embodiments, the method further comprises: running a global chip counter referenced to the system time (system time (in chips)); wherein the each channel, the offset address of the first symbol is determined as follows:

$$\text{offset address} = \frac{(\text{system time(in chips)} - REFTD(\text{in chips})) \mod (\text{buffer size} \times 2)}{\text{spreading factor}} \quad (EQ\ 1)$$

where REFTD is the reference time delay, and where buffer size is the size of one of the pair of buffers.

In some embodiments, the buffer size is selected to store symbols during 1536 chips.

In some embodiments, there is a maximum spreading factor used for MRC combining; and wherein if the traffic channel spreading factor is greater than the maximum spreading factor used in the first processor, the second processor is adapted to accumulate consecutive symbols read from the buffer to make the spreading factor.

In some embodiments, the method further comprises generating PN codes with reference to the reference time delay for use in de-spreading.

In some embodiments, generating PN codes with reference to the reference time delay comprises: running a global long code generator; every processing interval, copying an output of the global long code generator to a temporary long code generator; running the temporary long code generator; to an output of the temporary long code generator applying a user mask and a delay mask based on the reference time delay plus a processing delay to generate a traffic channel long code; to the output of the temporary long code generator applying the user mask and a delay mask based on the reference time to generate a pilot channel long code; running a short code generator; every processing interval, copying an output of the short code generator to a temporary short code generator; running the temporary short code generator; to an output of the temporary short code generator applying a delay mask based on the reference time delay plus a processing delay to generate a data channel short code; to the output of the temporary short code generator applying a delay mask based on the reference time to generate a pilot channel long code; combining the data channel short code and the data channel long code to generate a data channel PN code; combining the pilot channel short code and the pilot channel long code to generate a pilot channel PN code.

According to another broad aspect, the invention provides a system comprising: an A/D converter for sampling a multi-user CDMA signal having a chip rate to produce samples; an antenna buffer for storing the samples; sample processing circuitry adapted to for each user and for each processing interval: perform channel estimation for a plurality of fingers as a function of samples stored in the antenna buffer to produce a channel estimate for each finger; perform de-spreading for each of the plurality of fingers as a function of samples stored in the antenna buffer to produce a respective de-spread finger symbol; combine the de-spread finger symbols as a function of the channel estimates; wherein the antenna buffer has a size selected to allow de-spreading while accommodating a delay spread between fingers of a single user and to perform channel estimation using future samples.

In some embodiments, the sample processing circuitry comprises a first processor for performing de-spreading and channel estimation and combining, the system further comprising and a second processor for performing decoding.

In some embodiments, the antenna buffer is a circular buffer updated every processing interval.

In some embodiments, the antenna buffer is comprised of: a first field used to buffer the samples during a current processing interval; a second field used to align a symbol boundary of a user's latest finger so as to provide elasticity in user's finger timing adjustment; a third field to buffer samples for doing channel estimation using the future samples; and a fourth field to accommodate the delay, spread between a user's earliest finger and latest finger.

In some embodiments, the first field is 16-chips, the second field is 16 chips, the third field is 1536 chips and the fourth field is 352 chips.

In some embodiments, for each user: for each finger and for each processing interval: a) performing de-spreading for each finger as a function of samples stored in the antenna buffer to produce a respective de-spread finger symbol comprises reading samples from the antenna buffer from a respective data channel starting point to generate a de-spread data symbol; b) performing channel estimation for each finger as a function of samples stored in the antenna buffer to produce a channel estimate for the finger comprises reading samples from the antenna buffer from a respective pilot channel starting point to generate a de-spread pilot symbol, the pilot channel starting point being delayed from the data channel starting point by a predetermined amount such that the pilot channel starting point is in the future as compared to the data channel starting point, and generating a channel estimate as a function of de-spread pilot symbols generated for times before and after the respective data channel starting point; c) combining the de-spread finger symbols as a function of the channel estimates comprises multiplying the channel estimate by the de-spread data symbol to produce a scaled de-spread data symbol, and combining the scaled de-spread data symbol to produce a MRC combined symbol.

In some embodiments, the processing interval is 16 chips in duration.

In some embodiments, the multi-user CDMA signal is sampled at a sample rate at least twice the chip rate; the system further comprising an interpolator, wherein for each of a plurality of fingers having a respective delay determined to a resolution finer than a duration between samples, the interpolator performs an on-the-fly interpolation upon said samples to generate a selected one of a plurality of sample phases between the samples of the sampled CDMA signal, and the selected sample phase is used for de-spreading and channel estimation.

In some embodiments, the sample rate is $f_c$, where $f_c$ is the chip rate, and wherein interpolation is performed to generate one of four phases, thereby achieving an effective sample resolution of $f_c/8$.

In some embodiments, the system adapts to employ a table look-up method to do the interpolation.

In some embodiments, the table look-up method comprises: using four consecutive samples to generate one interpolated sample, with the nth interpolated sample is determined according to $$s(n, i) = \sum_{K=1}^{4} a_K^{(i)} s_K,$$

where $s_K$ is one of the four samples selected for interpolation (selected as a function of n), and i is the phase being calculated, the filter coefficients $a_K(i)$ being different depending on the phase being generated.

In some embodiments, the system further adapts to perform the interpolation by: precomputing all possible values of $V_1$ and $V_2$ in $s(n,i)=(a_1^{(i)}s_1+a_2^{(i)}s_2)+(a_3^{(i)}s_3+a_4^{(i)}s_4)=V_1+V_2$ and storing these in look-up tables, with two tables per phase.

In some embodiments, the system further adapts to perform interpolation by: processing the first two samples of the four consecutive samples by a selected one of four look-up tables 1A, 1B, 1C 1D; processing the next two samples of the four consecutive samples by a selected one of four look-up tables 2A, 2B, 2C, 2D; combining the results from the two selected look-up tables to give the interpolated sample.

In some embodiments, the system further adapts to perform interpolation by: reversing the order of the samples for odd phases; processing the first two samples of the four consecutive samples by a selected one of two look-up tables 1A, 1B; processing the next two samples of the four consecutive samples by a selected one of two look-up tables 2A, 2B; combining the results from the two selected look-up tables to give the interpolated sample.

According to another broad aspect, the invention provides a system comprising: a global system time reference for maintaining a global system time; receiving circuitry for receiving fingers of a multi-user CDMA signal, each finger of any user having a finger arrival time which is later than the system time by a respective finger delay; finger processing circuitry adapted to define for each user a reference time delay which is larger than a largest finger delay for the user, and to define for each user a respective reference time, the reference time being later than the system time by the reference time delay (reference time=system time+reference time delay), and to define for each finger of each user defining a first time advance relative to the reference time to be the reference time delay minus the finger delay and using this to find a pilot symbol start position in the buffer for pilot channel de-spreading, which will be used for channel estimation, and for each finger of each user defining a second time advance relative to the reference time to be the reference time delay minus the finger delay plus a processing delay and using this to find a traffic data symbol start position in the buffer for data channel de-spreading; wherein the reference time of all users is aligned with a common location in the antenna buffer.

In some embodiments, the system further comprises a PN code generating circuit which uses the reference time delay of each user to generate PN codes for de-spreading that user's signals.

In some embodiments, the reference time delay is set to be greater than a time difference between a latest finger arrival time and the global system time by at least a predetermined number of chips.

In some embodiments, the reference time delay is set to be greater than a time difference between a latest finger arrival time and the global system time by at least 1 chip.

In some embodiments, the system further adapts to: for each user monitor a difference between the reference time delay and a latest finger's arrival time and if the difference is less than a predetermined amount, delay the reference time delay by the processing interval and update the time advances of all the fingers associated with the new reference time delay by adding the processing interval to them.

In some embodiments, the system further adapts to execute steps comprising: at a next processing interval when the updates to the time advances take effect, producing a same symbol result as a previous symbol result, and either discarding the same symbol result or storing the same symbol result in a same memory location as the previous symbol result.

In some embodiments, the predetermined amount is 1 chip, the processing interval is 16 chips and the processing delay is 16-chips.

In some embodiments, the system further adapts to execute steps comprising: for each user when a difference between the reference time delay and a latest finger's delay is larger than a threshold for a period of time, advancing the reference time delay by the processing interval and updating the time advances of all the fingers associated with the new reference time delay by subtracting the processing interval from them.

In some embodiments, the system further adapts to execute steps comprising: at a next processing interval when the updates to the time advances take effect, producing two symbol results and store them in two consecutive memory locations, one symbol result being produced by using previous time advances and the other symbol result being produced by using new time advances.

In some embodiments, the predetermined amount is 1 chip, the processing interval is 16 chips and the processing delay is 16-chips.

According to another broad aspect, the invention provides a system comprising: a first processor for performing combined finger de-spreading and MRC (maximum ratio combining) combining to generate channel symbols; a symbol buffer for storing the channel symbols in a symbol buffer; a second processor for reading symbols from the symbol buffer using direct memory access and performing decoding on the symbols.

In some embodiments, the symbol buffer is implemented as a pair of buffers the each channel.

In some embodiments, for a selected buffer which alternates between the buffers of the pair of buffers, the first processor writes to the selected buffer with an offset address which compensates for a difference between system time and a reference time for the channel until the selected buffer is full; wherein reading symbols from the symbol buffer with a second processor using direct memory access and performing decoding on the symbols is done using the buffer of the pair of buffers other than the selected buffer.

In some embodiments, the system further comprises: running a global chip counter referenced to the system time (system time (in chips)); wherein the each channel, the offset address of the first symbol is determined as follows:

$$\text{offset address} = \frac{(\text{system time(in chips)} - \text{REFTD(in chips)})}{\text{spreading factor}} \quad (EQ\ 1)$$

where REFTD is a reference time delay defined for each user, and where buffer size is the size of one of the pair of buffers.

In some embodiments, the buffer size is selected to store symbols during 1536 chips.

In some embodiments, there is a maximum spreading factor used for MRC combining; and wherein if the traffic channel spreading factor is greater than the maximum spreading factor used in the first processor, the second processor is adapted to accumulate consecutive symbols read from the buffer to make the spreading factor.

According to another broad aspect, the invention provides a method of generating FN codes with reference to a reference time delay for use in de-spreading comprising: running a global long code generator; every processing interval, making a copy of an output of the global long code generator to the temporary long code generator; running the temporary long code generator, to an output of the temporary long code generator applying a user mask and a delay mask based on the reference time delay plus a processing delay to generate a traffic channel long code; to the output of the temporary long code generator applying the user mask and a delay mask based on the reference time to generate a pilot channel long code; running a short code generator; every processing interval, copying an output of the short code generator to a temporary short code generator; running the temporary short code generator; to an output of the temporary short code generator applying a delay mask based on the reference time delay plus a processing delay to generate a data channel short code; to the output of the temporary short code generator applying a delay mask based on the reference time to generate a pilot channel long code; combining the data channel short code and the data channel long code to generate a data channel PN code; combining the pilot channel short code and the pilot channel long code to generate a pilot channel PN code.

According to another broad aspect, the invention provides a method comprising: for each of a plurality of users, performing channel estimation, de-spreading and MRC combining directly upon contents of an antenna buffer without buffering de-spread symbols with an antenna buffer that is sized to accommodate a delay spread between fingers of a single user.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
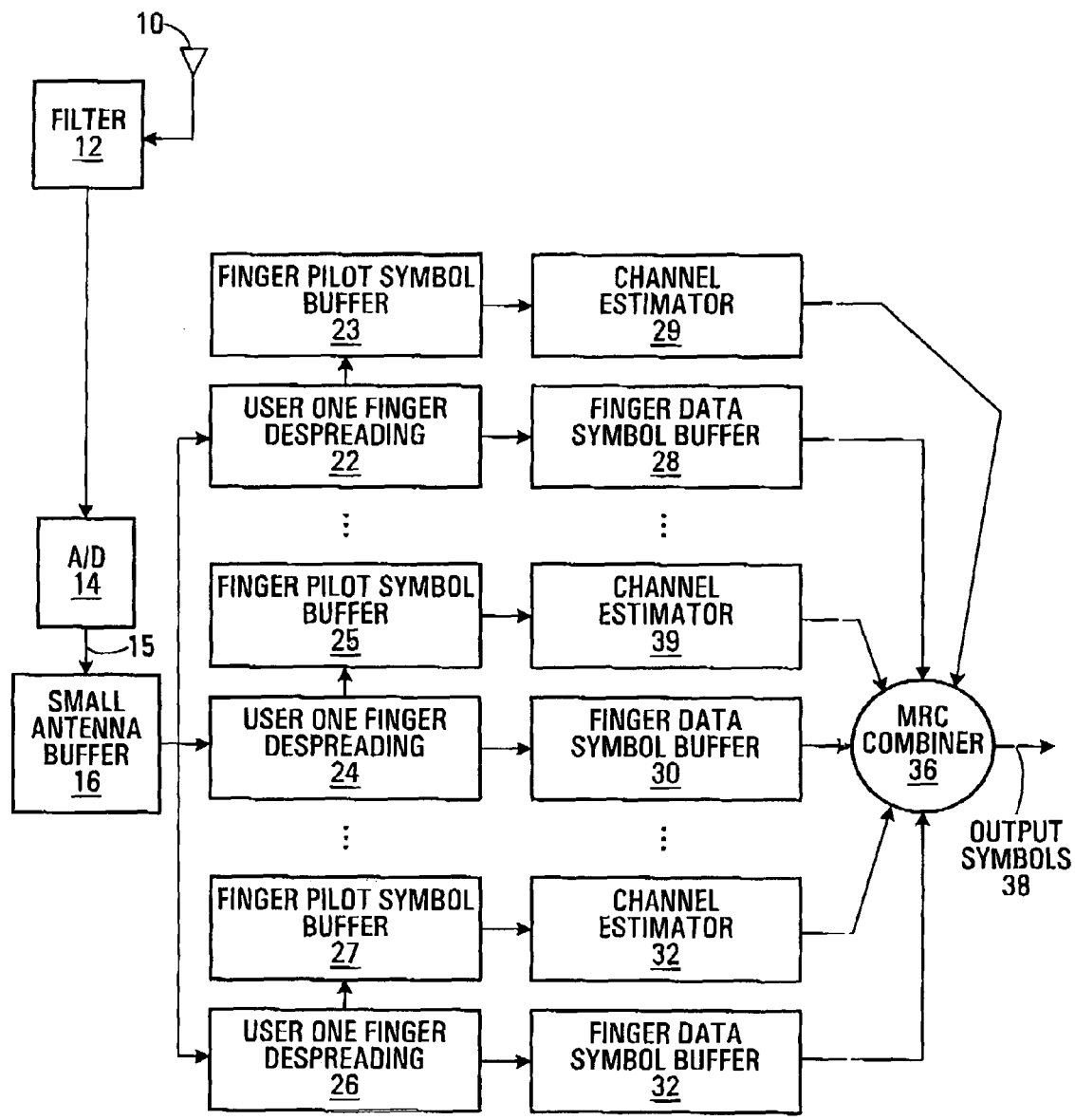
FIG. 1 is a block diagram of a conventional CDMA receiver.
Figure 2:
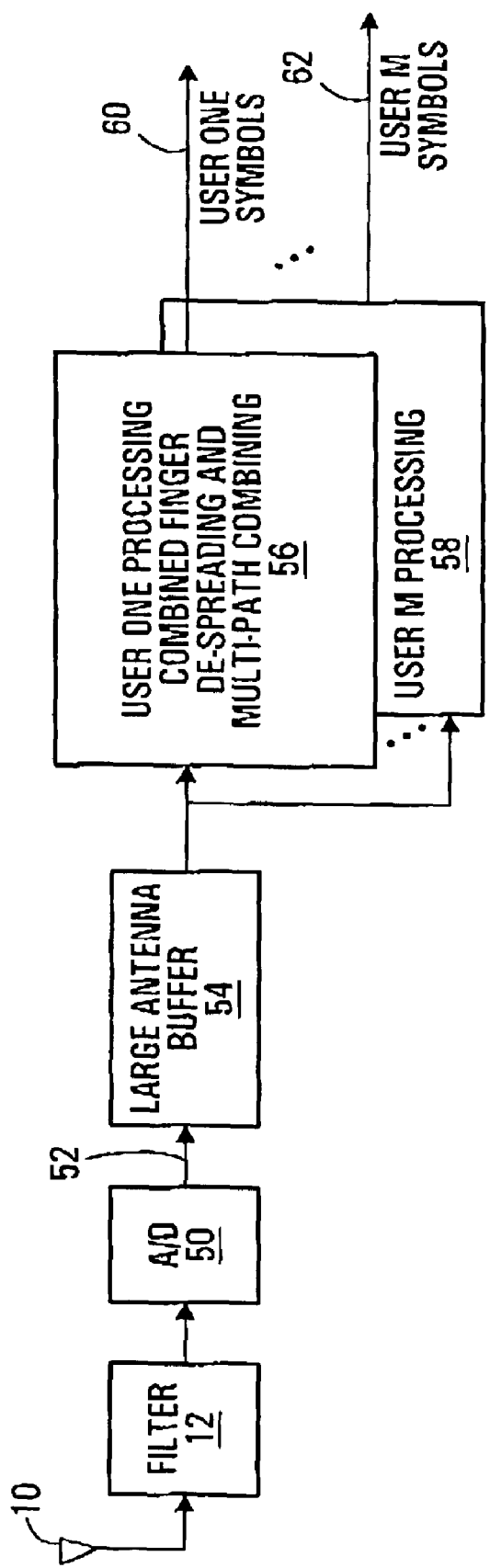
FIG. 2 is a block diagram of a CDMA receiver provided by an embodiment of the invention featuring a large antenna buffer.

An example receiver design provided by an embodiment of the invention is shown in block diagram form in FIG. 2. Like the prior art arrangement of FIG. 1, this includes an antenna 10 and filter 12. There might be other components involved with the initial processing. The functionality prior to the A/D converter 50 would vary from implementation to implementation, and is not essential to the invention. The output of the filter 12 is processed by an A/D converter 50 which generates samples 52 which are then stored in a large antenna buffer 54. In a preferred embodiment of the invention, the A/D converter 50 samples at a lower rate than that used in the conventional arrangement. This is described further below. The large antenna buffer 54 contains enough signal samples to perform user one processing, generally indicated at 56, this consisting of combined finger de-spreading and multi-path combining to generate user one symbols 60. Similarly, user M processing occurs in the same way, as generally indicated at 58, and produces user M symbols 62. In the combined finger de-spreading and multi-path combining of FIG. 2, there is no requirement to buffer finger symbols. The various user processing functionality 56,58 operates on the same single large antenna buffer 54. In the embodiments of the invention described below, the multi-path combining performed for each user is MRC combining (maximum ratio combining). However, for other implementations, other types of multi-path combining can alternatively be employed. The important consideration is that the large antenna buffer 54 be large enough to perform both finger de-spreading and multi-path combining on the basis of the contents of the buffer at a given instant.

Throughout this specification, a single large antenna buffer 54 is referred to. More generally, for multi-antenna systems, there will be a respective large antenna buffer for each antenna. For example, in a system with nine sector cells, with two antennas per cell, there will be 18 large antenna buffers per cell. This could of course be combined in one larger memory space. For a given user, the fingers might be in the same antenna buffer, or in different antenna buffers. In the description that follows, it is assumed that the fingers are in the same antenna buffer. The only change for fingers in different antenna buffers is to read from different antenna buffers for the different finger processing.

It is noted that separate blocks 56,58 are shown in FIG. 2 to allow parallel processing of multiple signals. In another embodiment the hardware implementation processes multiple users signals in serial, one after the other. This requires the processing clock rate to be much greater than the chip rate. Common hardware resources are time multiplexed across multiple users and/or channels. It is noted that in a preferred embodiment, the entire functionality of block 56 is implemented in a single chip, referred to herein as a chip rate processor, or CRP. This avoids the need to transfer intermediate results between multiple components. The output of CRP would then by an MRC combined output which is fed to a DSP where decoding, typically Viterbi and Turbo decoding, is performed.

Figure 3:
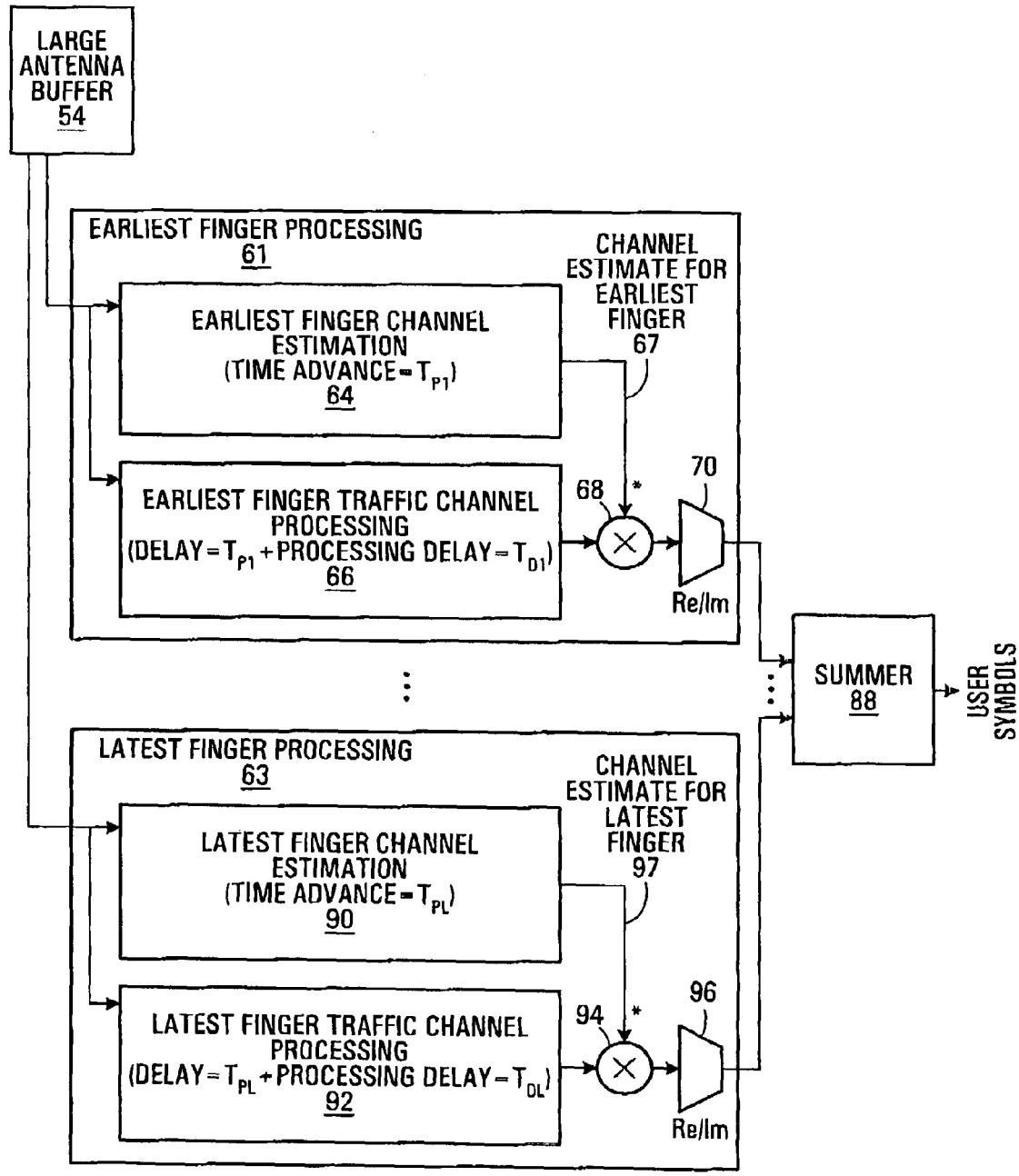
FIG. 3 is another embodiment of a CDMA receiver provided by an embodiment of the invention.

Further details of an example implementation of the combined finger de-spreading and MRC combining are shown in FIG. 3 for a single user. The processing for the earliest finger, designated earliest finger processing 61 processes samples from the large antenna buffer 54. Similarly, latest finger processing 63 processes samples from the large antenna buffer 54 at the same time. The earliest finger processing 61 includes earliest finger channel estimation 64 which processes samples from the large antenna buffer 54 associated a time advance $T_{P1}$. The particular samples which are read from the large antenna buffer 54 associated with the time advance $T_{P1}$ are described in further detail below. $T_{P1}$ is a time advance associated with the earliest finger. The earliest finger channel estimation 64 generates a channel estimate 67 for the earliest finger. Also shown is earliest finger traffic channel processing 66 which performs processing to recover channel symbols. This function 66 operates with a time advance $T_{P1}$ plus a processing delay designed to allow the earliest finger channel estimation 61 to complete its channel estimation task, yielding a total time advance of $T_{D1}$. The output of the earliest finger channel processing 66 is multiplied by the channel estimate 67 in multiplier 68. It is noted that all of the functions shown would be typically implemented for both I and Q channels or for complex channels. Block 70 indicates that for a given channel, a different part (real or imaginary component) might be taken to recover the channel. For example, for the CDMA fundamental channel, the imaginary part is taken. The output of this function is input to summer 88. The computation of the weighted sum (multiply finger outputs by their corresponding channel estimates and summing) is MRC combining.

Similar processing blocks are shown for the latest finger processing 63, and similar functionality would be included for fingers having delays between the earliest finger and latest finger. The time advance associated with the latest finger channel estimation 90 is $T_{PL}$, this being the latest finger time advance. The time advance associated with the latest finger traffic channel processing 92 is $T_{DL}$, this equalling $T_{PL}$ plus the processing delay.

It is noted that the functionality of FIG. 3 needs to be repeated, either with additional hardware, or by serial processing, for each data channel of a user. Thus, if a given user has a fundamental channel and a supplemental channel, the process is repeated twice. If multiple channels are processed in a single ASIC/device, then in a preferred embodiment, the channel estimation is only done once for the multiple channels. If channels are processed in different ASICs/devices, channel estimation can be repeated in each ASIC/device.

Large Antenna Buffer

The large antenna buffer is provided to buffer the received CDMA signals, so that the receiver can do both de-spreading and MRC at the same time without having to buffer the de-spread finger symbols.

Figure 4:
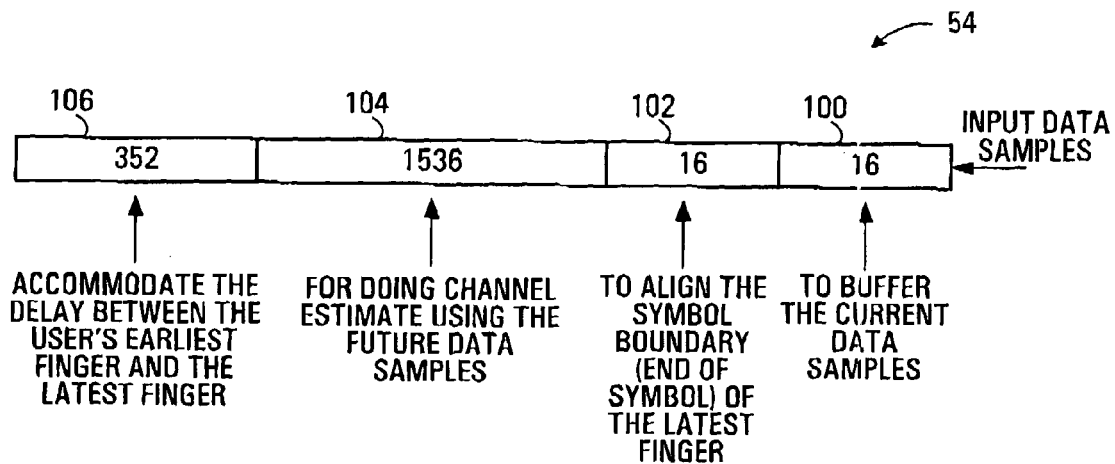
FIG. 4 shows an example layout of the contents of the large antenna buffer.

An example implementation of the large antenna buffer is shown in FIG. 4 where a logical breakdown of the samples stored in the buffer is shown. The antenna buffer 54 can be partitioned logically into four parts from the right side of the drawing representing the latest samples to the left side of the drawing representing the earliest samples. It is to be understood that these examples are for the purpose of illustration only. For this example, it is assumed that processing occurs every 16 chips. Generally, the processing interval is a power of 2 and equal to the most common (or convenient) spreading factor in the CDMA system.

There is a 16-chip field 100 used to buffer the input data samples during the current processing iteration (16 chips); these samples would not be read during the current processing interval. By "16-chip field" it is meant that the field is large enough to store samples taken over a 16-chip time interval.

There is a 16-chip field 102 used to align the symbol boundary of the user's latest finger. This is for elasticity in user's finger timing adjustment.

There is a 1536 chip 104 field to buffer the input samples for doing channel estimation using the future data samples. In a preferred embodiment this is one PCG (power control group) and has a size in time equal to the separation in time between power control commands, every 1.25 ms in CDMA standards.

There is a 352-chip field 106 to accommodate the delay between the user's earliest finger and the latest finger. The size of this field determines the maximum finger delay spread of a user supported by the receiver.

Assuming that the sampling rate is $2f_c$ and each sample is represented by 5 bits for each of I and Q channels, with 18 antennas, the total antenna buffer size would be $$(16+16+1536+352)(chips) \times 2(f_c) \times 2(I/Q) \times 5(bits) \times 18 \text{ (antenna)} = 691.2 \text{ Kbits} \quad (EQ1)$$

Figure 8:
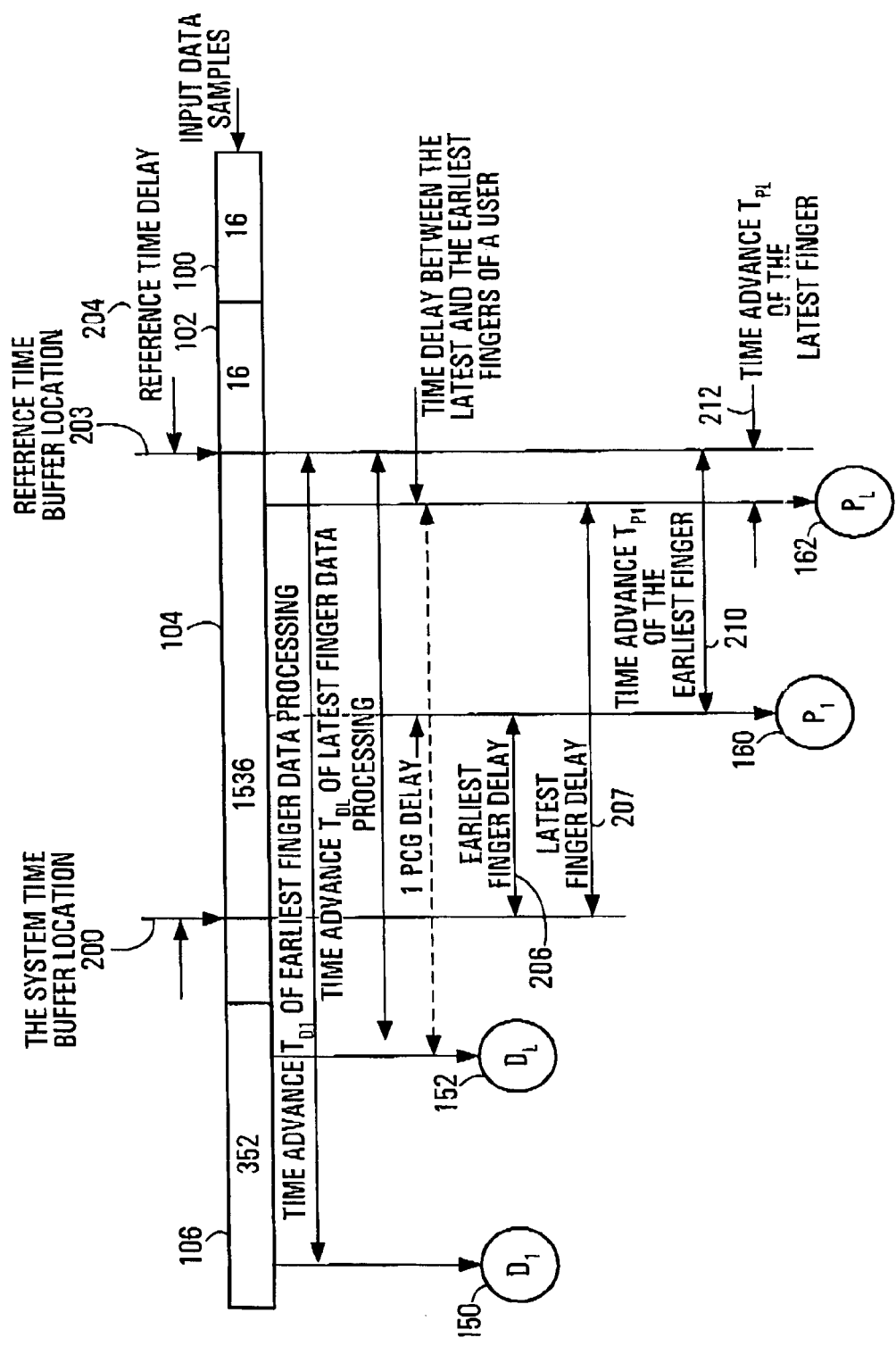
FIG. 8 shows the antenna buffer layout of FIG. 4 with various timing relationships illustrated.

Base station transmissions are aligned with system time, and the system time is typically defined by sequence of even second pulses. A given mobile station will receive the base station's transmission after a one-way delay and will set its own clock based on the one-way delay. The mobile station's transmissions are generated and received by the base station after a round trip delay. FIG. 8 shows various timing relationships. These are described in further detail below.

The last three parts 102, 104, 106 of the antenna buffer 54 form a circular buffer. Logically, this means that each time 16 new samples are read, these are added to the front of the buffer and the oldest 16 samples are discarded. It is updated every 16-chips, where the update time is aligned with the system time at even second boundaries. This simply involves relocating pointers to the start of the buffer so that data does not need to be moved within the buffer each update time.

Interpolation Filter

In order to reduce the required size of the antenna input buffer, an interpolation filter is introduced to convert lower rate samples stored in the buffer to higher rate samples on the fly. To simplify the implementation, a table look-up method is provided to do the interpolation.

As detailed above, the large antenna buffer 54 contains samples taken at the Nyquist sampling rate ($2f_c$) and this is only a quarter of the rate used in the conventional arrangement discussed with respect to FIG. 1, where $8f_c$ sampling rate was employed. This allows the large antenna buffer to be made one quarter as large as it would be required to be if the full over-sampling rate were employed. Over-sampling is employed to allow a higher resolution in determining the finger delays. By sampling at $8f_c$, there are eight possible sample phases to be used in the chip rate processing ($1f_c$). The first sample phase is the first sample and every eighth sample thereafter. The second sample phase is the second sample and every eighth sample thereafter and so on. These eight sample phases are not readily available when sampling is only conducted at a rate of $2f_c$. To deal with this, a novel interpolation technique has been provided by an embodiment of the invention which allows the generation of any of the eight sets of samples substantially as if they had been sampled that way in the first place. Since samples are taken at a rate of $2f_c$, in order to generate any of the eight possible permutations of samples, an interpolator is required to generate the different sample "phases".

Of course, in an embodiment in which the full sampling rate is employed in filling the large antenna buffer, no interpolation filter would be required. Furthermore, the number of phases that would need to be able to be generated would differ as a function of the ratio between the desired effective sampling rate and the actual sampling rate used to fill the large antenna buffer. That is, the sub-chip resolution of the receiver follows directly from the sampling rate. This limitation is circumvented in the proposed embodiment.

In one embodiment, an interpolation filter is used to interpolate the desired phase samples (at the resolution of 1/8 chip) on the fly. Many interpolation methods can be employed. A very specific interpolation solution is provided below. However, it is to be understood that more generally, where a higher sample resolution for de-spreading is desired than the resolution stored in the large antenna buffer, any suitable interpolation system/method can be employed. In preferred embodiments, interpolation methods are implemented using table look-up solutions which take advantage of the symmetry of interpolation thereby reducing the number of table look-up values required to be stored by half. The example described below achieves this.

In one embodiment, four consecutive samples are used to generate one interpolated sample. This amounts to a filtering function, and the nth interpolated sample is determined according to $$s(n, i) = \sum_{K=1}^{4} a_K^{(i)} s_K,$$

where $s_K$ is one of the four samples selected for interpolation (selected as a function of n), and i is the phase being calculated. The filter is different depending on the phase being selected. This can be re-written as $$s(n,i)=(a_1^{(i)}s_1+a_2^{(i)}s_2)+(a_3^{(i)}s_3+a_4^{(i)}s_4)=V_1+V_2$$

Since there are a finite number of values for each sample, namely 5 for 5 bit samples, all the possible values of $V_1$ and $V_2$ can be pre-computed and stored in tables. This would require two look-up tables for each of four phases. The coarseness introduced by sampling at lower rate (ie. $2f_c$ verses $8 f_c$) is partially offset by increasing the bit Width of the sampled antenna data. System performance at 5 bits per sample at $2f_c$ is comparable to that at 4 bits per sample at $8f_c$.

Figure 5A:
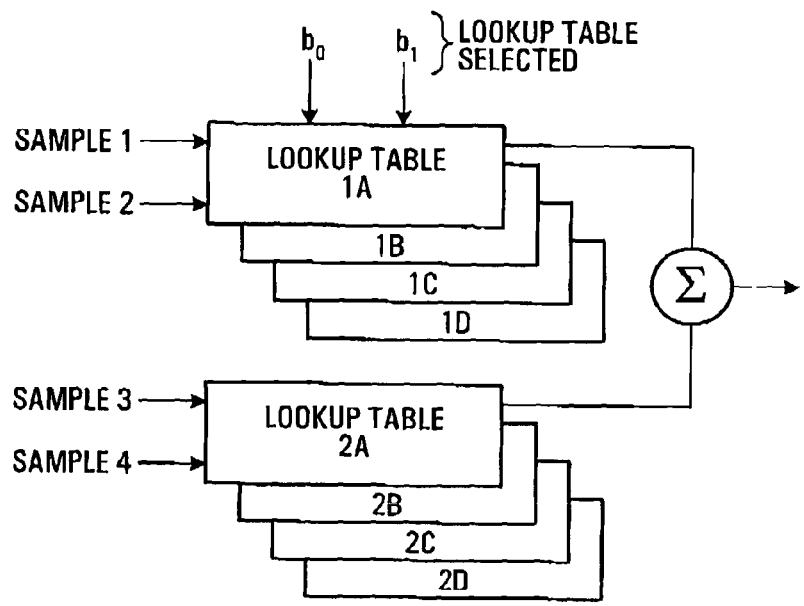
FIG. 5A is a block diagram of a first method of performing interpolation on antenna samples.

Logically, the interpolation filter functions are shown in FIG. 5A. Four consecutive samples are processed to generate a single interpolated sample. The first two samples are processed by a selected one or tour look-up tables 1A, 1B, 1C 1D and the second two samples are processed by a selected one of four look-up tables 2A, 2B, 2C, 2D. The two phase selection bits $b_0, b_1$, select which tables to use. The results from the two selected look-up tables are combined to give the interpolated result.

Depending upon which tables are selected, one of the four possible phases is generated at the output. The interpolation filter takes four input samples with a precision of 5 bits and generates one output sample with precision of 5 bits at a different phase within 1/8 chip. In operation, each of the look-up table sets 1A, 1B, 1C, 1D and 2A, 2B, 2C, 2D takes two input samples with two-bit table selection and generates one output sample. Their results are summed together to generate the final interpolated sample. The memory size for the interpolation filter would be $$(2^{5(bits)})^{2(samples)} \times 2(\text{tables}) \times 4(\text{sub-filters}) \times 5(\text{bits})$$
$$=40.96 \text{ kbits} \quad (EQ\ 2)$$

Since the interpolation filter coefficients are symmetric, the coefficients of table 1A are the same as those of table 1D, and the coefficients of table 1B are the same as those of table 1C, but in a reverse order. To be more specific, suppose that the coefficients of sub-filter used to generate table 1A and sub-filter used to generate table 1B are [c0, c1, c2, c3] and [c4, c5, c6, c7], respectively. The coefficients of the sub-filter used to generate table 1D and sub-filter used to generate table 1C would be [c3, c2, c1, c0] and [c7, c6, c5, c4], respectively. As a result, one only needs to store the calculated results for two of the sub-filters in the look-up tables. One may reduce the look-up table size by half by swapping the order of the input samples appropriately. If the phases are referred to as phase 0, phase 1, phase 2 and phase 3, if the sample to be interpolated is in phase zero or phase one, the order of the input samples would be [s1, s2, s3, s4]. Table 1A is selected for the output sample in phase zero and table 1B for the output sample in phase one. If the sample to be interpolated is in phase two or phase three, the order of the input samples would be [s4, s3, s2, s1]. Table 1A is selected for the output sample in phase three and table 18 for the output sample in phase two. The two-bit table selection is divided into two parts. One bit is used to indicate the order of the input samples, and the other is used to select sub-filter 1 or sub-filter 2. The memory size for the new interpolation filter would be $$(2^{5(bits)})^{2(samples)} \times 2(\text{tables}) \times 2(\text{sub-filters}) \times 5(\text{bits})$$
$$=20.48 \text{ kbits} \quad (EQ\ 3)$$

Figure 5B:
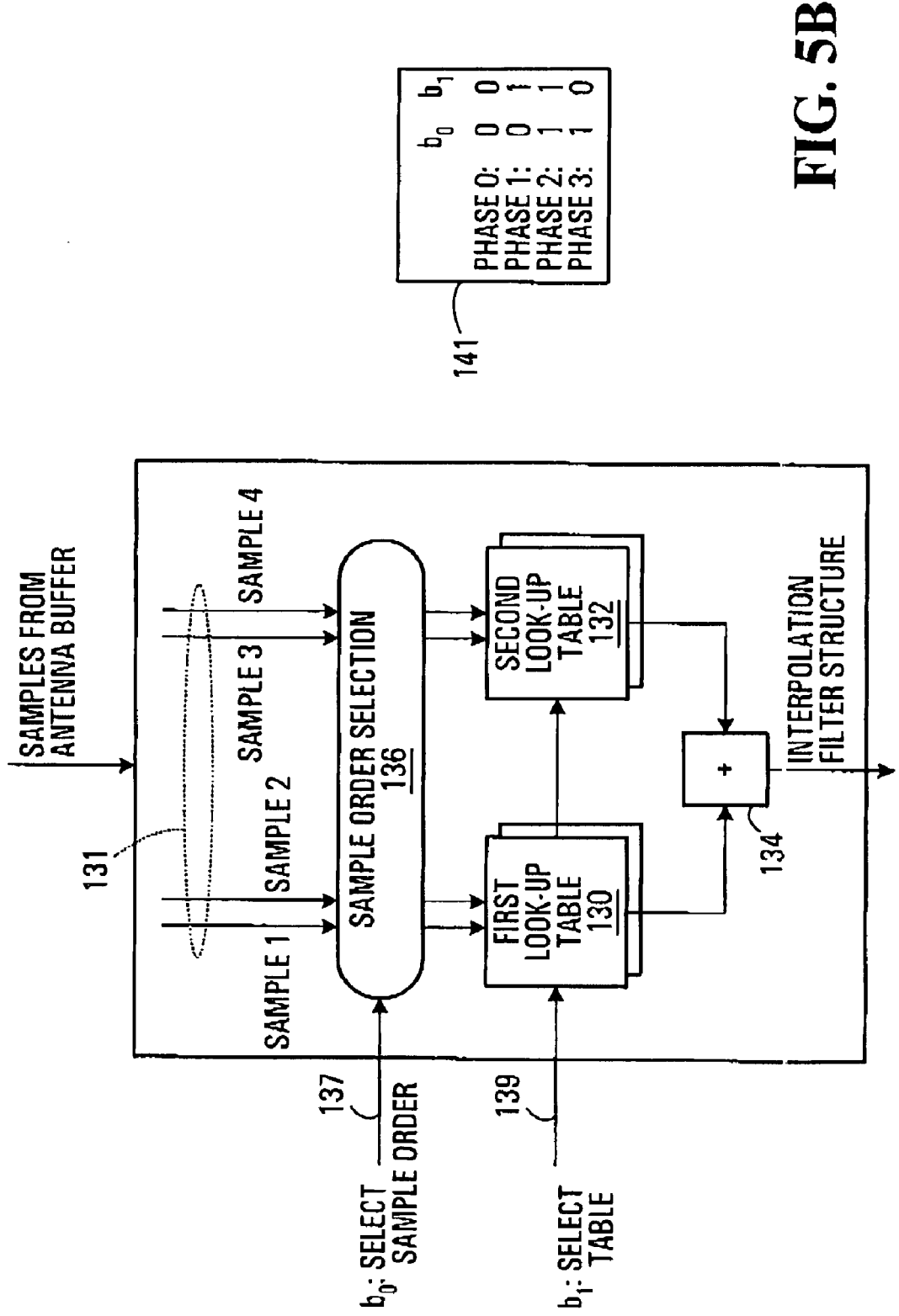
FIG. 5B is a block diagram of a second method of performing interpolation on antenna buffer samples.

A simplified implementation featuring the reduced memory size is shown in FIG. 5B. Interpolation filter has four sample inputs 131 this simply representing four consecutive samples read from the antenna buffer. The samples are processed by a sample order selection function 136 which either passes the samples on in the order they were received, or flips the samples to be in reverse order. Whether or not to flip the samples is determined by input $b_0$ 137 which is a select sample order input. Two of the samples are used to control look-up in a first look-up table 130 while the other two samples are used to control look-up in a second look-up table 132. There are two possible tables for each of the look-up tables 130,132 and these are selected by input $b_1$ 139 which is a select table input. The selection between the four possible phases is determined by the appropriate selection of $b_0$ and $b_1$ as indicated by the table generally indicated at 141. The outputs of the table look-up functions are combined with adder 134 to generate the overall output. It is noted that the interpolation function could be done using a single large table without the adder. However, the resulting table would be very large. Dividing the table look-up into two parts, combined with an adder, results in a more efficient implementation.

Channel Estimation and MRC for Traffic Data Channels

Figure 6:
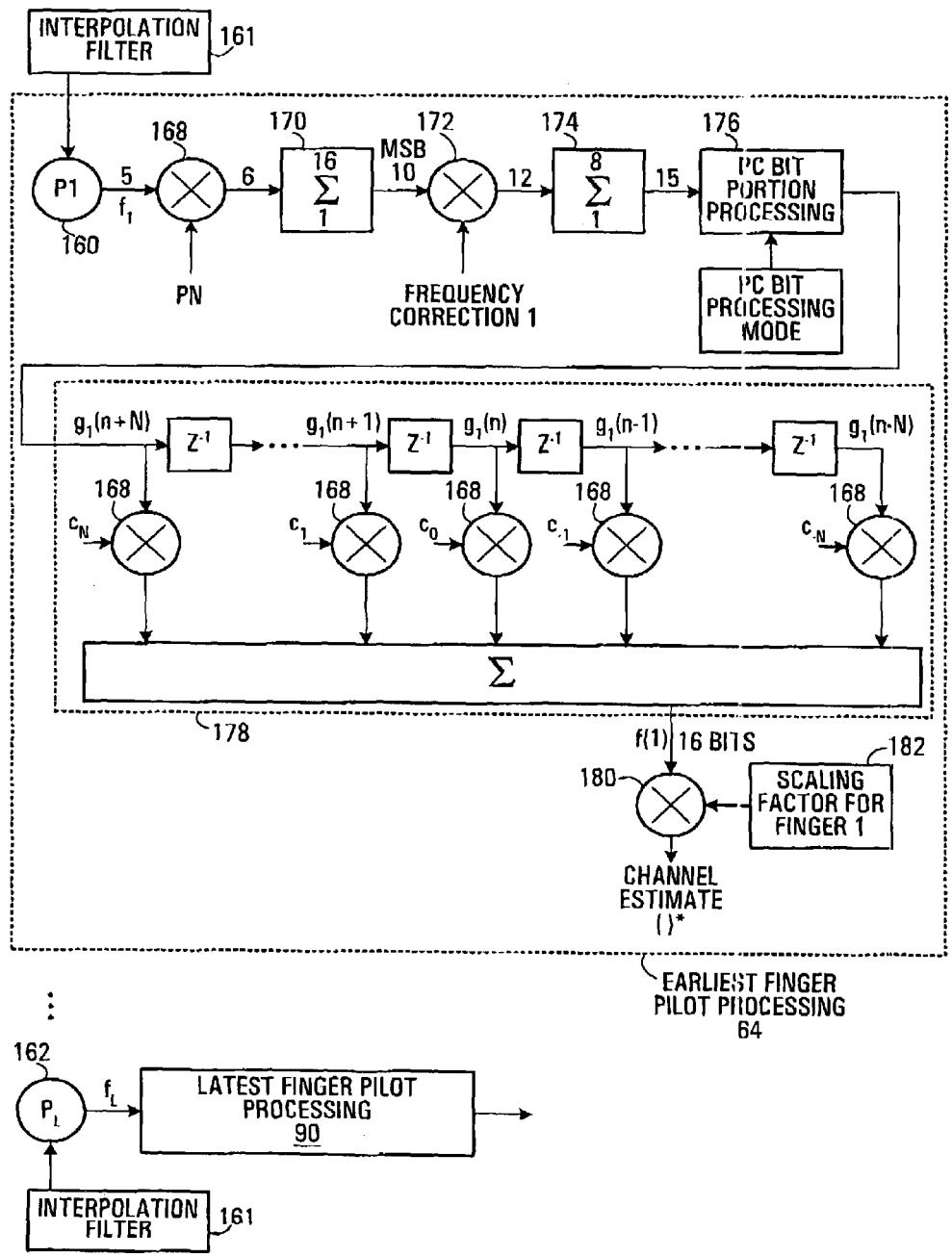
FIG. 6 is a block diagram of pilot finger processing.
Figure 7:
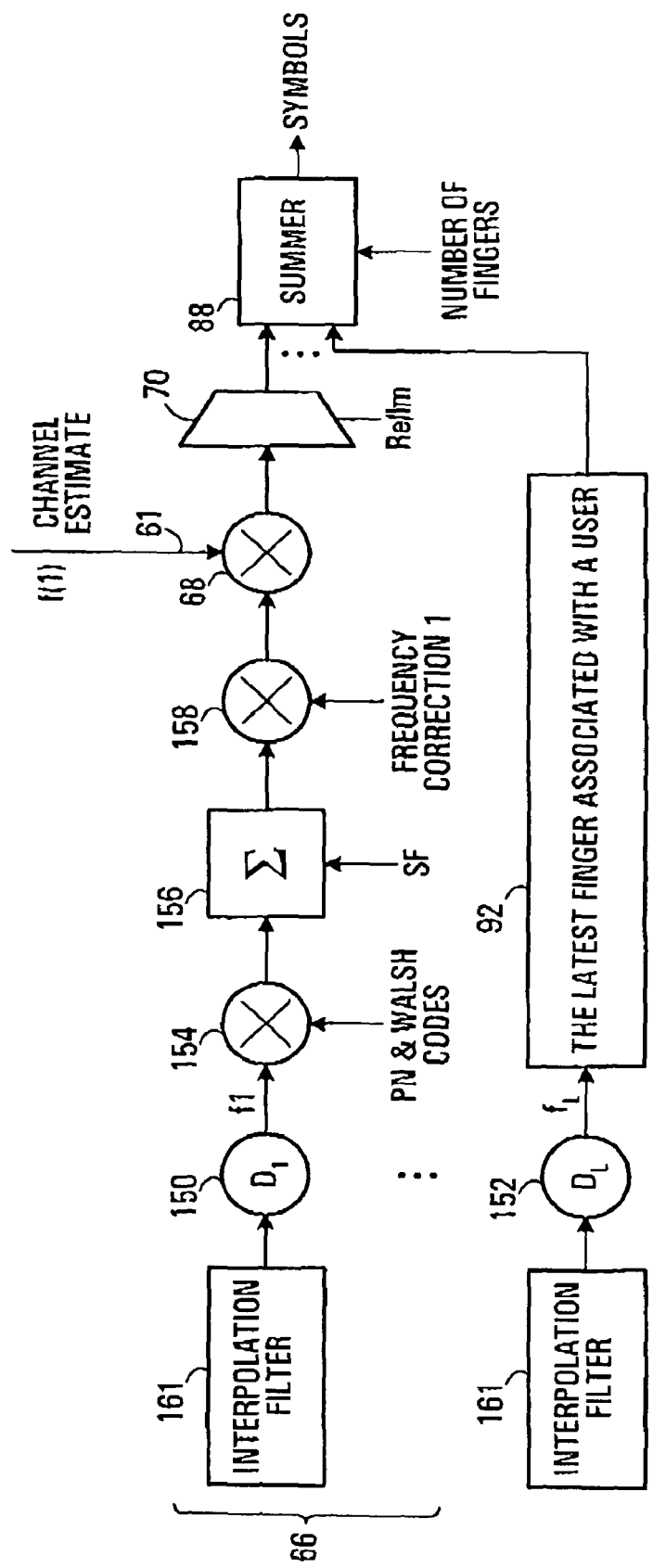
FIG. 7 is a block diagram of channel processing.

FIGS. 6 and 7 show detailed implementation examples for doing channel estimation and traffic channel processing respectively. It is noted additional functions might be present in a realization, such as RF down converters for example. In a preferred implementation, it is desirable to use both the past and future data samples (2 PCG in duration) to do channel estimation for maximum ratio combining the current data symbol. The samples used for MRC are delayed relative to the samples used for channel estimation. In a preferred implementation they are delayed by 1 PCG.

At each processing iteration (16 chips), the traffic channel processing first de-spreads the data signal for each finger $$d(i) = \sum_{n=1}^{SF} x_i(n)p(n)*w(n) \quad \text{(EQ 4)}$$

where $x_i(n)$ is the complex-valued interpolated sample of finger computed from the antenna input buffer, $p(n)$ is the complex-valued PN code, and $w(n)$ is the Walsh code and $d(i)$ is the complex-valued de-spread value. It is then multiplied by its corresponding channel estimate and the result is accumulated as follows:

$$s = \sum_{i=1}^{L} d(i)f(i)* \quad \text{(EQ 5)}$$

where S is the maximum ratio combined symbol, $f(i)$ is the channel estimate for finger i and L is the number of the fingers for MRC.

As indicated above, preferably the channel estimate is calculated using samples both before and after the current processing interval. In a preferred embodiment, for each processing interval, the newest samples are processed to generate a de-spread value for those samples. This is determined according to:

$$\sum_{n=1}^{16} x_i(n)p(n)*, \quad \text{(EQ 6)}$$

where $x_i$ for n=1 to 16 are the newest 16 samples interpolated for the ith finger. After a number of processing intervals, for example 8, these results are accumulated to give a single de-spread result for a longer duration. For a 128 chip accumulation, this would require 8 processing intervals to give one 128 chip de-spread value. This 128 chip de-spread value is then stored for use in generating the channel estimate. This will be designated $g_i(n+N)$, where i again indicates the ith finger, and N indicates that this is the newest of N 128 chip de-spread values being maintained after the current processing. There are N 128 bit de-spread values are also maintained prior to the current processing period for a total of 2N+1 values being maintained. The current channel estimate is then determined by combining these 128 chip de-spread values using a filter, for example in accordance with the following equation:

$$f(i) = g_i(n+N)c_N + \sum_{k=-N}^{N-1} g_i(n+k)c_k \quad \text{(EQ 7)}$$

where $[c_{-N}\ c_{-N+1}\ \ldots\ c_{N-1}\ c_N]$ are the filter coefficients for channel estimation. They can be updated on the fly to reflect the channel conditions of the reverse link being processed. For example, if the Doppler frequency spread is large due to the high-speed mobile, the filter coefficients can be set to implement a wider bandwidth. If the mobile speed is low, the filter coefficients can be set to implement a narrower bandwidth. In a preferred embodiment, the channel estimate is determined using samplers which are approximately 1 PCG in the past and approximately 1 PCG in the future. In a preferred embodiment, N is 11, so 23/24 of two PCGs worth of samples are used. Since 1 PCG is 1536 chips in duration, a 23/24 PCG duration would be 2944 chips. This in turn would require 23 128 chip de-spread value. In other words 2N+1=23.

The pilot processing should be able to finish calculating (EQ 7) for all the fingers within 128 chips. More generally, it is advantageous to perform channel estimation over some duration which can be implementation specific.

Some part of the pilot signals might have embedded power control bits. There are various ways of processing the power control bit portion of the pilot signal of each finger. A first one is to zero out the PC bit portion of the pilot signal. A second one is to leave it as is if there is no power control bit punctured on the pilot signal. A third one is to decode the PC bit first and then multiply the PC bit portion of the pilot signal with the decoded result (+1 or −1). Other ways might also be employed.

Referring now to FIG. 6, the earliest finger channel estimation is again indicated by 64. Samples are read from the input data buffer from starting position $P_1$ indicated at 160. These starting positions are detailed below in the discussion of FIG. 8. In embodiments featuring interpolation, the samples are read via the interpolation filter 161 set to generate the appropriate phase. These are then multiplied by the PN code with multiplier 168 and accumulated over 16 chips with summer 170. Frequency correction is performed at 172. Frequency correction involves multiplying by a complex sinusoid to undo/compensate for constant rate time varying phase rotation in I/Q signal caused by Doppler frequency or frequency offset in system. A further summation over eight samples is performed at 174 to yield a newest value for $g_1(n+N)$. Summer 170 and 174 collectively sum over 128 samples for a given channel estimate update iteration. If any power control processing is performed, as described by way of example above, this is performed as indicated at 176. The output is then fed to a channel estimation filter 178 which produces the channel estimate f(1) as discussed above. This is multiplied at 180 with a scaling factor 182. The scaling factor is chosen to maximize dynamic range of signal processing for a given finger of a user. Similar functionality is provided for each of the other fingers. The latest finger channel estimation processing is indicated generally at 90.

Referring now to FIG. 7, the earliest finger traffic channel processing is indicated generally at 66. This takes samples from the antenna buffer from starting position $D_1$ as indicated at 150. In embodiments featuring interpolation, the samples are read via the interpolation filter 161 set to generate the appropriate phase. These samples Walsh and PN de-spread at 154 and accumulated over the spreading factor for a given channel at 156. Frequency correction is performed at 158. The result is then multiplied by the channel estimate f(1) with multiplier 68. As before, the channel select function (real/imaginary branch) 70 is shown and this produces an output which is fed to the summer 88. The channel processing is also shown indicated at 92 for the latest finger. This takes samples from starting position $D_L$ indicated at 152.

Timing for the User's Finger Signal De-spreading and MRC

As discussed previously, the buffer is sized so as to accommodate the delay spread of a single user. If the buffer were to be large enough to accommodate the delay spread of all the users, the buffer would need to be an impractically large size. What this means is that for a user which is closer to the base station, the contents of the buffer will represent information recently transmitted by the user, and for a user which is far from the base station, the contents of the buffer will represent information transmitted by at an earlier time. This means that with reference to a global system time, processing might be occurring for the close user for symbols which are received after a one symbol round trip delay, while processing is occurring for the far user for symbols which are received after an N symbol round trip delay, i.e. during a given processing interval, processing occurs for symbols which are (N−1) symbol older for the far user, than for the closer user. This requires a somewhat complicated timing arrangement to be maintained to control where to start reading from the buffer to de-spread a symbol of a given user.

The timing for the users finger signal de-spreading and MRC for a given user will now be described with reference to FIG. 8 which shows the antenna buffer 54 with various times indicated. There is a global system time representing time at the receiver. Each of the fingers will have an associated delay with respect to the system time, this being the round trip delay for that finger.

For each user, a reference time delay (REF-TD) is defined which is preferably set to be greater than the latest finger delay (which is the time difference between the latest finger's arrival time and the system time) of the user by at least 1 chip, so that all the fingers' EOL (Early time, On-time, and Late time) and MRC implementations can be performed within the same processing interval. Preferably, the reference time delay is a multiple of 16 chips. More generally, it is preferably a multiple of the processing interval. For example, if the latest finger's delay is 20 chips, the REF-TD could be set to 32 chips. If the latest finger's delay is 32 chips, the REF-TD could be set to 48 chips.

For each user, a reference time is defined with respect to the system time, and used as the time reference for generating the PN codes as well as for counting the number of symbols in a PCG or a frame. The reference time is the system time delayed by the reference time delay.

In order that processing for all users can be performed on the basis of the contents of the buffer at the same time interval, the reference times of all of the users is aligned by arbitrarily associating all of the reference times with the same buffer location. In the example of FIG. 8, the reference time buffer location is shown at 203.

The reference time delay in turn defines where in the buffer the system time points for each user. Since the reference time of all users has been aligned in the buffer, the location of system time in the buffer for each user will be different. The system time buffer location for one user is indicated at 200, this being earlier by the reference time delay 204 for the user. If the reference time delay is 0, the reference time buffer location 203 will be aligned with the system time buffer location 200.

Each of the fingers will have an associated delay with respect to the system time. In the illustrated example, the earliest finger has an earliest finger delay 206 and the latest finger has a latest finger delay 207. Other fingers of the user would have delays between these two values.

For each finger, for data channel processing and pilot channel processing there are two timing parameters: one is the REF-TD and the other is the time advance relative to the reference time, which is equal to the REF-TD minus the finger's delay. This time advance $T_{P1}$ is shown at 210 for the earliest finger pilot processing and $T_{PL}$ 212 for the latest finger pilot processing.

The processing of the data channel occurs later than the processing of the pilot channel so that a channel estimate which incorporates "future" content can be generated. In the illustrated example, the processing for the data occurs after a 1 PCG delay (1536 chips), but other values can alternatively be employed. Also shown in FIG. 8 is the time advance $T_{D1}$ 151 for the earliest finger data processing and $T_{DL}$ 153 for the latest finger data processing.

For example, if the REF-TD is 64 chips and the finger's time delay is 30.25 chips, the time advance of the finger relative to its reference time would be 33.75 chips. The start position of the symbol in the antenna buffer is at sample 6 of chip 33 (counted to the left from the reference time), where we assume each chip has 8 samples which are numbered from 0 to 7 (counting from right to left in FIG. 8). As discussed above, in the preferred embodiment only two samples are stored per chip. The samples 0 to 7 within one chip are obtained using interpolation.

The starting position in the buffer for extracting samples to be employed when calculating the channel estimate is indicated at $P_1$ 160 for the earliest finger and $P_L$ for the latest finger. The start position used for channel traffic processing is further delayed to enable the completion of the channel estimate. Thus, the start position for channel processing of the earliest finger is indicated at $D_1$ 150, and the start position for channel processing for the latest finger is indicated at $D_L$ 152. $D_1$ and $D_L$ are delayed by a processing delay from $P_1$ and $P_L$ respectively. In one embodiment, this processing delay is 1 PCG, or 1536 chips.

Due to the alignment of the reference time, the symbols generated for each user may be different in time with respect to the system time. This needs to be taken into account when using the symbols for decoding for example. This can be achieved by storing the symbols in a symbol buffer with an offset address which accommodates for the various times. An example of this is provided in the section below dealing with CRP to DSP interface.

A specific size of the antenna buffer has been described. More generally, the size of the antenna buffer is selected firstly to buffer enough samples to do the channel estimation. Secondly, it is selected to cover the delay profile of a single user. The delay profile is the difference between the earliest finger and the latest finger of a given user. This difference is typically less than 64 chips. Preferably, the antenna buffer does not need to be large enough to cover the delay profiles of all users. This would include multi-path components of users very close to the receiver and multi-path components of users near the cell edge. Rather, by appropriately selecting the reference time for each user as a function of the users finger delay, the delay spread of each user can be accommodated even when different users have very different delays.

For each user, the difference between the reference time delay and the latest finger's delay is monitored. If their difference is less than some amount, for example 1 chip, REF-TD is reset to delay it by some amount, for example by 16 chips and the time advances of all the fingers associated with the new REF-TD are updated by adding the same amount, for example 16-chip, delay to them. At the next processing iteration when the updates take effect, the same symbol result will be produced as the previous one which will be either discarded or stored in the same memory location as the previous one in the event the output is being stored in an output symbol buffer.

When the difference between the reference time delay and the latest finger's delay is larger than some amount, for example 16 chips, for a long period of time, the REF-TD may be advanced by some amount, for example 16 chips, and the time advances of all the fingers associated are updated with the new REF-TD by subtracting that amount from them. At the next processing iteration when the updates take effect, two symbols are produced and stored in two consecutive memory locations in the output symbol buffer. One is produced by using the previous timing parameters and the other is produced by using the current timing parameters.

New Finger Allocation and Finger Timing Adjustment (Tracking)

In some embodiments of the invention, the finger processing capabilities are allocatable dynamically such that each user will have a respective allocated number of fingers. Typically a searching function is employed to look for multi-path components of a given user, and when a significant new multi-path component is found, a new finger can be allocated. The subject of searching for new multi-path components is well documented and is not the subject of this application.

If a new finger to be allocated (or if an existing finger after timing adjustment) is not the latest finger or if it is the latest finger, but the difference between the reference time delay and the finger's delay is no less than 1 chip, the advance time relative to the reference time is calculated by using the following formula advance time=REFTD−finger time delay  (EQ 8)

Then REF-TD and the new advance time are used for the finger.

If the new finger to be allocated (or if the finger after timing adjustment) is the latest finger, and the difference between the reference time delay and the finger's delay is less than 1 chip, the REF-TD is adjusted according to $$REFTD = \begin{cases} 16 \text{ if } int\left(\frac{\text{finger time delay}}{16}\right) \times 16 + \\ \quad int\left(\frac{\text{finger time delay}}{16}\right) \times 16 + 16 - \text{finger time delay} \geq 1 \\ 32 \text{ if } int\left(\frac{\text{finger time delay}}{16}\right) \times 16 + \\ \quad int\left(\frac{\text{finger time delay}}{16}\right) \times 16 + 16 - \text{finger time delay} < 1. \end{cases}$$
(EQ 9)

Then the time advances of all the fingers associated with this REF-TD should also be adjusted based on advance time=REFTD−finger time delay  (EQ 8)

If the reference time is delayed by multiple 16-chips due to new finger allocation or finger timing adjustment, the EOL symbols need to be inhibited accordingly. For example, if the reference time is delayed by 32 chips, two EOL symbols need to be inhibited. The argument is also true for the traffic data symbols.

In some embodiments, a table referred to as a "finger task configuration table" is provided which contains for each finger the reference time delay REF-TD, and the advance time.

A new entry in the table would be created for a given user when a new finger is allocated. This table is then updated as discussed above when changes in the reference time delay and finger time delay occur due to mobility of the user or due to the allocation of a new finger to the user.

Interface Between CRP and DSP

Figure 10:
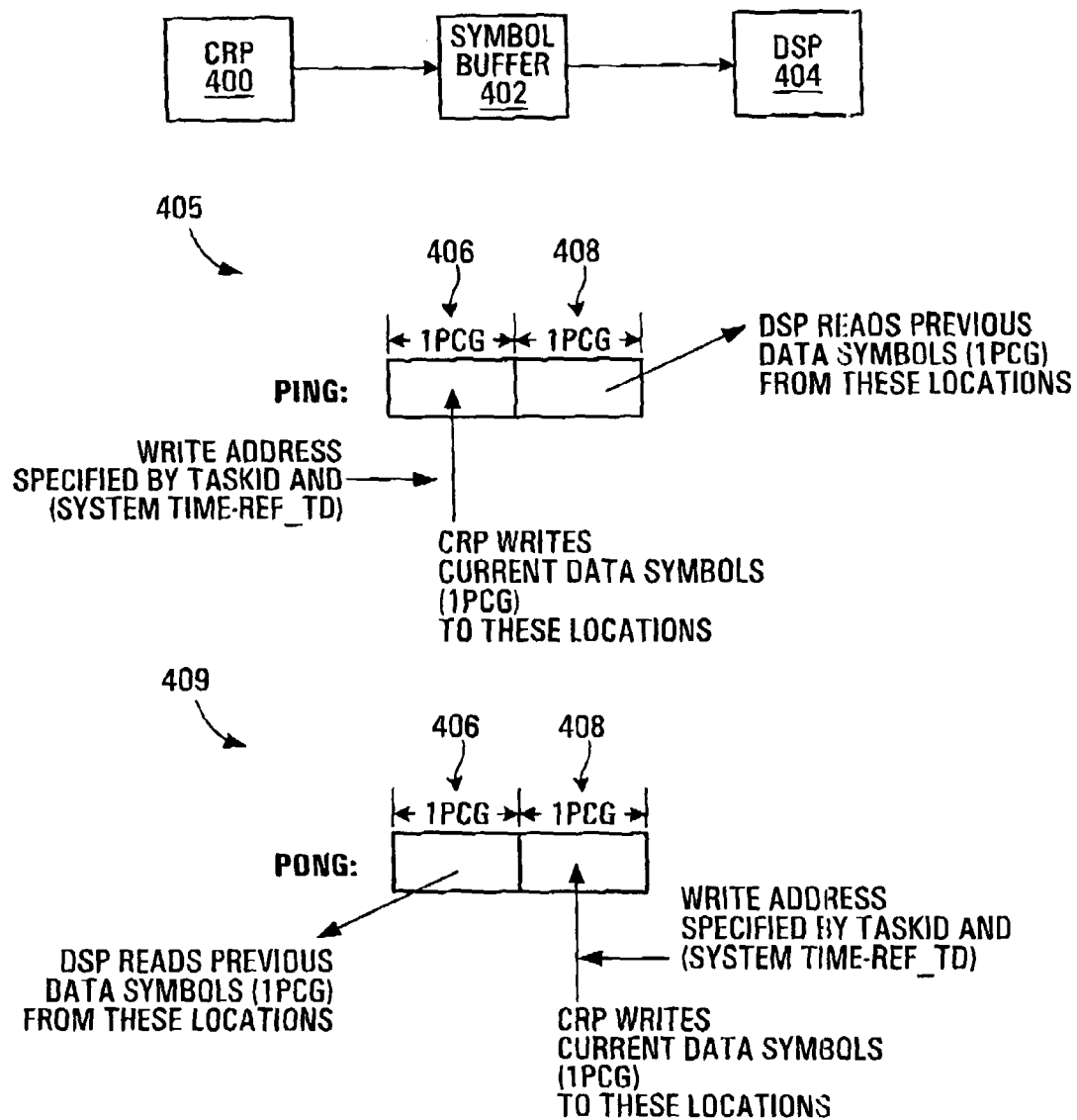
FIG. 10 is a simple system hardware block diagram for an example implementation.

Referring now to FIG. 10 shown is an example hardware implementation. There is a first processor 400 referred to as a CRP (chip rate processor) in which all of the above detailed de-spreading, channel estimation and MRC combining take place. There is a symbol buffer 402 in which is stored the output of the CRP. Finally, there is a second processor 404, for example a DSP (digital signal processor), which has direct memory access to the buffer 402.

In a preferred embodiment, EDMA (Enhanced Direct Memory Access) is used to transfer the symbol results from the CRP 400 to the DSP 404 via the symbol buffer 402 which stores the results of MRC. One arrangement is to use ping-pong buffers. A pair of such ping pong buffers is provided for each user and for each channel. Each ping or pong buffer stores some period worth of one symbols for the channel, for example one PCG worth of symbols. This ping pong buffers might for example be implemented with a larger memory bank within which a respective task ID specifies a base address for the ping pong buffers of each channel.

The buffer in first state is indicated at 405. The buffer has two halves (ping and pong) 406,408 each large enough to contain 1 PCG worth of symbols output by the CRP in this example for a given channel. This will be 1536/16=96 symbols per user if the symbol spreading factor is 16. If the spreading factor is 8, then the buffers would contain 192 symbols. Preferably, if the spreading factor is greater than 16, 16 de-spreading is still performed, and combining to get the greater de-spreading is performed in the DSP.

Symbols are written to the first half 406 to a write address specified by task_ID and offset address for the given user. While the first half is being filled up, previously written symbols are read by the DSP from the second half 408. When the first half is full, the roles of the two halves are reversed, and the state generally indicated at 409 occurs. Here, samples are being written to the second half by CRP while being read from the first half by DSP.

As discussed previously, to accommodate the delay spread of different users simultaneously, the CRP may be computing symbols at different times with respect to system time for each user. In order that the symbols of all users are stored in the ping pong buffers aligned with system time, each user's data is written to the buffers with an offset. A global chip counter is maintained referenced to the system time. The offset address of the first symbol within the current 16 chips can be calculated as follows.

$$\text{offset address} = \frac{(\text{system time(in chips)} - REFTD(\text{in chips})) \mod (1536 \times 2)}{\text{spreading factor}}$$
(EQ 10)

where it is assumed that the maximum spreading factor is 16 chips. The above equation has assumed one PCG of data (1536) in each ping and pong buffer. The value 1536 of course would change if the buffers were of a different size.

Suppose that at the current processing iteration, the global chip counter value is 128 chips, and the time reference delay is 64 chips. If the spreading factor is 16, the offset address can be calculated as $$\text{offset address} = \frac{(128 - 64) \mod (1536 \times 2)}{16} = 4$$
(EQ 11)

If the spreading factor is 8, the offset address for the first symbol is 8, and the offset address for the second symbol is 9.

As indicated above, the traffic channel spreading factor may be larger than that the largest spreading factor used in the MRC combiner. In such cases, preferably the DSP accumulates consecutive symbols to make the spreading factor larger than the largest spreading factor. For example, if the MRC has 16 as the largest spreading factor, and a particular traffic channel has a 32 chip Spreading factor, pairs of MRC outputs can be Combined by DSP to make a symbol with a spreading factor of 32.

Long Code and Short Code Generation for De-spreading

Figure 9:
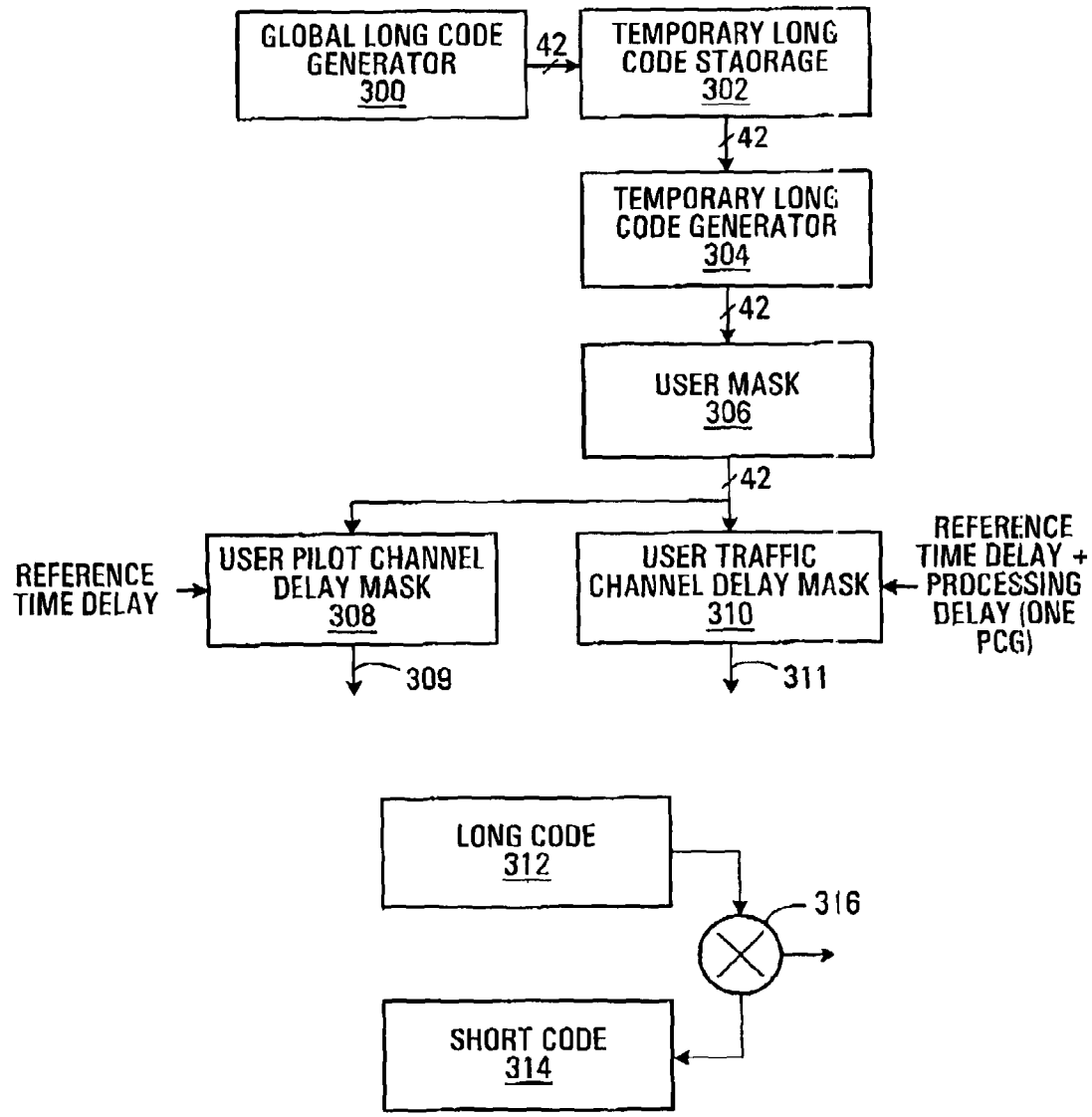
FIG. 9 is a very simple block diagram of a system for generating delayed PN codes.

In some embodiments, a long PN code and a short PN code generator are used to generate the PN codes for de-spreading the finger signals. A preferred embodiment of the PN code generation circuit is shown in FIG. 9. Shown is long code generation circuitry 312 and short code generation circuitry 314. Circuits 312,314 have outputs which are combined in multiplier 316 to give the required PN code. The details of the long code generation circuitry 312 are shown in the top of FIG. 9. The short code generation circuitry 314 is the same with the exception of the fact that there is no user mask, and as such the details of the short code generation circuitry 314 will not be expanded upon further.

When the base station is powered on, the modem in the base station is responsible for synchronizing a global long code generator 300 (PN code generator) with the system time. The states of the PN codes are updated per chip. When the antenna buffer is updated with new 16 chip samples, the current states of the global long code generator are copied to a temporary storage 302. During one processing iteration (16-chip interval), the state of the temporary long code storage 302 will not be changed.

The temporary long code generator 304 reads the state of the temporary long code storage 302, and generates long codes for 16 subsequent chip periods. The long PN code used for de-spreading the finger signal is obtained by first applying the user's long code mask 306 to the temporary long code generator 304. The output of the user mask 306 masked with user pilot channel delay mask 308 to generate a single bit per chip at output 309. The input to the user pilot channel delay mask 309 is the reference time delay, which controls the delay applied. Similarly, the output of the user mask 306 is also delayed with a user traffic channel delay mask 310 the output 311 of which is the long PN code for traffic channel de-spreading. The delay input to the user traffic channel delay mask 310 is the reference time delay plus the processing delay between pilot and data channel processing, one PCG in preferred embodiments.

In a preferred embodiment, the functionality of FIG. 9 is implemented once in hardware, and is processed in serial for multiple users. After a given user's signal is despread, the states of the temporary long code generators 304 and temporary short code generators, (not shown) are returned to the states stored in the temporary long code storage 302 and temporary short code storage (not shown) so that de-spreading for other users can be performed. The processing for all of the users needs to be complete within the processing interval of 16 chips in the embodiments described.

Numerous modifications and variations of the present invention are possible in light of the above teachings. It is therefore to be understood that within the scope of the appended claims, the invention may be practised otherwise than as specifically described herein.

We claim:

1. A method comprising:
sampling a multi-user CDMA signal having a chip rate to produce samples and storing the samples in an antenna buffer;
for each user and for each processing interval:
performing channel estimation for a plurality of fingers as a function of samples stored in the antenna buffer to produce a channel estimate for each finger;
performing de-spreading for each of the plurality of fingers as a function of samples stored in the antenna buffer to produce a respective de-spread finger symbol;
combining the de-spread finger symbols as a function of the channel estimates;
wherein the antenna buffer has a size selected to allow de-spreading while accommodating a delay spread between fingers of a single user and to perform channel estimation using future samples.

2. A method according to claim 1 wherein the de-spread finger symbols are combined without buffering the de-spread finger symbols.

3. A method according to claim 1 wherein the antenna buffer is a circular buffer updated every processing interval.

4. A method according to claim 1 wherein the antenna buffer is comprised of:
a first field used to buffer the samples during a current processing interval:
a second field used to align a symbol boundary of a user's latest finger so as to provide elasticity in user's finger timing adjustment;
a third field to buffer input samples for doing channel estimation using the future samples; and
a fourth field to accommodate the delay spread between a user's earliest finger and latest finger.

5. A method according to claim 4 wherein the third field has a size in time equal to a separation in time between power control commands.

6. A method according to claim 4 wherein the first field is 16-chips, the second field is 16 chips, the third field is 1536 chips and the fourth field is 352 chips.

7. A method according to claim 1 wherein for each user:
for each finger and for each processing interval:
a) performing de-spreading for each finger as a function of samples stored in the antenna buffer to produce a respective de-spread finger symbol comprises reading samples from the antenna buffer from a respective data channel starting point to generate a de-spread data symbol;
b) performing channel estimation for each finger as a function of samples stored in the antenna buffer to produce a channel estimate for the finger comprises reading samples from the antenna buffer from a respective pilot channel starting point to generate a de-spread pilot symbol, the pilot channel starting point being delayed from the data channel starting point by a predetermined amount such that the pilot channel starting point is in the future as compared to the data channel starting point, and generating a channel estimate as a function of de-spread pilot symbols generated for times before and after the respective data channel starting point;
c) combining the de-spread finger symbols as a function of the channel estimates comprises multiplying the channel estimate by the de-spread data symbol to produce a scaled de-spread data symbol, and combining the scaled de-spread data symbol to produce a MRC combined symbol.

8. A method according to claim 1 wherein the processing interval is 16 chips in duration.

9. A method according to claim 1 further wherein the multi-user CDMA signal is sampled at a sample rate at least twice the chip rate;
for each of a plurality of fingers having a respective delay determined to a resolution finer than a duration between samples, performing an on-the-fly interpolation upon said samples to generate a selected one of a plurality of sample phases between the samples of the sampled CDMA signal, and using the selected sample phase for de-spreading and channel estimation.

10. A method according to claim 9 wherein the sample rate is $2f_c$, where $f_c$ is the chip rate, and wherein interpolation is performed to generate one of four phases, thereby achieving an effective sample resolution of $f_c/8$.

11. A method according to claim 9 comprising employing a table look-up method to do the interpolation.

12. A method according to claim 11 wherein the table look-up method comprises:
using a plurality of consecutive samples to generate one interpolated sample.

13. A method according to claim 12 comprising:
using four consecutive samples to generate one interpolated sample, with the nth interpolated sample is determined according to $$s(n, i) = \sum_{K=1}^{4} a_K^{(i)} s_K,$$

where $s_K$ is one of the four samples selected for interpolation (selected as a function of n), and i is the phase being calculated, the filter coefficients $a_K(i)$ being different depending on the phase being generated.

14. A method according to claim 13 further comprising:
precomputing all possible values of $V_1$ and $V_2$ in $s(n,i)=(a_1^{(i)}s_1+a_2^{(i)}s_2)+(a_3^{(i)}s_3+a(_4^{(i)}s_4)=V_1+V_2$ and storing these in look-up tables, with two tables per phase.

15. A method according to claim 14 comprising:
processing the first two samples of the four consecutive samples by a selected one of four look-up tables 1A, 1B, 1C 1D;
processing the next two samples of the four consecutive samples by a selected one of four look-up tables 2A, 2B, 2C, 2D;
combining the results from the two selected look-up tables to give the interpolated sample.

16. A method according to claim 14 comprising;
reversing the order of the samples for odd phases;
processing the first two samples of the four consecutive samples by a selected one of two look-up tables 1A, 1B;
processing the next two samples of the four consecutive samples by a selected one of two look-up tables 2A, 2B;
combining the results from the two selected look-up tables to give the interpolated sample.

17. A method according to claim 12 comprising:
using L consecutive samples, L>=3, to generate one interpolated sample, with the nth interpolated sample is determined according to $$s(n, i) = \sum_{K=1}^{L} a_K^{(i)} s_K,$$

where $s_K$ is one of the L samples selected for interpolation (selected as a function of n), and i is the phase being calculated, the filter coefficients $a_K(i)$ being different depending on the phase being selected.

18. A method according to claim 17 further comprising:
for at least two subsets of the L consecutive samples, determining all possible values of at least two subsets of sums of values of $a_k^{(i)}s_K$ to generate a respective look-up table per phase.

19. A method according to claim 18 further comprising: for at least two subsets of the L consecutive samples, determining all possible values of at least two subsets of sums of values of $a_K^{(i)}s_K$ to generate a respective look-up table for half the phases, using samples directly for half of the phases, and reversing the order of the samples for the other half of the phases.

20. A method according to claim 1 further comprising:
maintaining a global system time each finger of any user having a finger arrival time which is later than the system time by a respective finger delay;
for each user defining a reference time delay which is larger than a largest finger delay for the user;
defining for each user a respective reference time, the reference time being later than the system time by the reference time delay (reference time=system time+reference time delay):
for each finger of each user defining a first time advance relative to the reference time to be the reference time delay minus the finger delay and using this to find a pilot symbol start position in the buffer for pilot channel de-spreading, which will be used for channel estimation;
for each finger of each user defining a second time advance relative to the reference time to be the reference time delay minus the finger delay plus a processing delay and using this to find a traffic data symbol start position in the buffer for data channel de-spreading:
wherein the reference time of all users is aligned with a common location in the antenna buffer.

21. A method according to claim 20 further comprising using the reference time delay to generate PN codes for de-spreading.

22. A method according to claim 20 further comprising using the reference time delay to count the number of symbols in a PCG (power control group) or a frame.

23. A method according to claim 20 wherein the reference time delay is set to be a multiple of the processing interval.

24. A method according to claim 23 wherein the processing interval is 16 chips.

25. A method according to claim 20 wherein the reference time delay is set to be greater than a time difference between a latest finger arrival time and the global system time by at least a predetermined number of chips.

26. A method according to claim 20 wherein the reference time delay is set to be greater than a time difference between a latest finger arrival time and the global system time by at least 1 chip.

27. A method according to claim 20 further comprising:
for each user monitoring a difference between the reference time delay and a latest finger's arrival time and if the difference is less than a predetermined amount, delaying the reference time delay by the processing interval and updating the time advances of all the fingers associated with the new reference time delay by adding the processing interval to them.

28. A method according to claim 27 further comprising:
at a next processing interval when the updates to the time advances take effect, producing a same symbol result as a previous symbol result, and either discarding the same symbol result or storing the same symbol result in a same memory location as the previous symbol result.

29. A method according to claim 27 wherein the predetermined amount is chip, the processing interval is 16 chips and the processing delay is 16-chips.

30. A method according to claim 27 further comprising:
for each user when a difference between the reference time delay and a latest finger's delay is larger than a threshold for a period of time, advancing the reference time delay by the processing interval and updating the time advances of all the fingers associated with the new reference time delay by subtracting the processing interval from them.

31. A method according to claim 30 further comprising:
at a next processing interval when the updates to the time advances take effect, producing two symbol results and store them in two consecutive memory locations, one symbol result being produced by using previous time advances and the other symbol result being produced by using new time advances.

32. A method according to claim 30 wherein the predetermined amount is 1 chip, the processing interval is 16 chips and the processing delay is 16-chips.

33. A method according to claim 20 further comprising:
performing combined finger de-spreading and MRC (maximum ratio combining) combining in a first processor to generate channel symbols and storing the channel symbols in a symbol buffer;
reading symbols from the symbol buffer with a second processor using direct memory access and performing decoding on the symbols.

34. A method according to claim 33 wherein the symbol buffer is implemented as a pair of buffers the each channel.

35. A method system according to claim 34 further comprising:
for a selected buffer which alternates between the buffers of the pair of buffers, writing to the selected buffer with an offset address which compensates for a difference between system time and a reference time for the channel until the selected buffer is full;
wherein reading symbols from the symbol buffer with a second processor using direct memory access and performing decoding on the symbols is done using the buffer of the pair of buffers other than the selected buffer.

36. A method according to claim 35 further comprising:
running a global chip counter referenced to the system time (system time (in chips));
wherein the each channel, the offset address of the first symbol is determined as follows:

$$\text{offset address} = \frac{(\text{system time(in chips)} - \text{REFTD(in chips)}) \mod (\text{buffer size} \times 2)}{\text{spreading factor}} \quad (EQ\ 1)$$

where REFTD is the reference time delay, and where buffer size is the size of one of the pair of buffers.

37. A method according to claim 36 wherein the buffer size is selected to store symbols during 1536 chips.

38. A method according to claim 33 wherein there is a maximum spreading factor used for MRC combining; and wherein if the traffic channel spreading factor is greater than the maximum spreading factor used in the first processor, the second processor is adapted to accumulate consecutive symbols read from the buffer to make the spreading factor.

39. A method according to claim 20 further comprising generating PN codes with reference to the reference time delay for use in de-spreading.

40. A method according to claim 39 wherein generating PN codes with reference to the reference time delay comprises:
running a global long code generator;
every processing interval, copying an output of the global long code generator to a temporary long code generator;
running the temporary long code generator;
to an output of the temporary long code generator applying a user mask and a delay mask based on the reference time delay plus a processing delay to generate a traffic channel long code:
to the output of the temporary long code generator applying the user mask and a delay mask based on the reference time to generate a pilot channel long code;
running a short code generator;
every processing interval, copying an output of the short code generator to a temporary short code generator;
running the temporary short code generator;
to an output of the temporary short code generator applying a delay mask based on the reference time delay plus a processing delay to generate a data channel short code;
to the output of the temporary short code generator applying a delay mask based on the reference time to generate a pilot channel long code;
combining the data channel short code and the data channel long code to generate a data channel PN code;
combining the pilot channel short code and the pilot channel long code to generate a pilot channel PN code.

41. A system comprising:
an A/D converter for sampling a multi-user CDMA signal having a chip rate to produce samples;
an antenna buffer for storing the samples;
sample processing circuitry adapted to for each user and for each processing interval:
perform channel estimation for a plurality of fingers as a function of samples stored in the antenna buffer to produce a channel estimate for each finger;
perform de-spreading for each of the plurality of fingers as a function of samples stored in the antenna buffer to produce a respective de-spread finger symbol;
combine the de-spread finger symbols as a function of the channel estimates;
wherein the antenna buffer has a size selected to allow de-spreading while accommodating a delay spread between fingers of a single user and to perform channel estimation using future samples.

42. A system according to claim 41 wherein the sample processing circuitry comprises a first processor for performing de-spreading and channel estimation and combining, the system further comprising a second processor for performing decoding.

43. A system according to claim 41 wherein the antenna buffer is a circular buffer updated every processing interval.

44. A system according to claim 41 wherein the antenna buffer is comprised of:
a first field used to buffer the samples during a current processing interval;
a second field used to align a symbol boundary of a user's latest finger so as to provide elasticity in user's finger timing adjustment;
a third field to buffer samples for doing channel estimation using the future samples; and
a fourth field to accommodate the delay spread between a user's earliest finger and latest finger.

45. A system according to claim 44 wherein the first field is 16-chips, the second field is 16 chips, the third field is 1536 chips and the fourth field is 352 chips.

46. A system according to claim 41 wherein for each user:
for each finger and for each processing interval:
a) performing de-spreading for each finger as a function of samples stored in the antenna buffer to produce a respective de-spread finger symbol comprises reading samples from the antenna buffer from a respective data channel starting point to generate a de-spread data symbol;

b) performing channel estimation for each finger as a function of samples stored in the antenna buffer to produce a channel estimate for the finger comprises reading samples from the antenna buffer from a respective pilot channel starting point to generate a de-spread pilot symbol, the pilot channel starting point being delayed from the data channel starting point by a predetermined amount such that the pilot channel starting point is in the future as compared to the data channel starting point, and generating a channel estimate as a function of de-spread pilot symbols generated for times before and after the respective data channel starting point;

c) combining the de-spread finger symbols as a function of the channel estimates comprises multiplying the channel estimate by the de-spread data symbol to produce a scaled de-spread data symbol, and combining the scaled de-spread data symbol to produce a MRC combined symbol.

47. A system according to claim 41 wherein the processing interval is 16 chips in duration.

48. A system according to claim 41 further wherein the multi-user CDMA signal is sampled at a sample rate at least twice the chip rate;

the system further comprising an interpolator, wherein for each of a plurality of fingers having a respective delay determined to a resolution finer than a duration between samples, the interpolator performs an on-the-fly interpolation upon said samples to generate a selected one of a plurality of sample phases between the samples of the sampled CDMA signal, and the selected sample phase is used for de-spreading and channel estimation.

49. A system according to claim 48 wherein the sample rate is $2f_c$, where $f_c$ is the chip rate, and wherein interpolation is performed to generate one of four phases, thereby achieving an effective sample resolution of $f_c/8$.

50. A system according to claim 49 adapted to employ a table look-up method to do the interpolation.

51. A system according to claim 49 wherein the table look-up method comprises:

using four consecutive samples to generate one interpolated sample, with the nth interpolated sample is determined according to $$s(n, i) = \sum_{K=1}^{4} a_K^{(i)} s_K,$$

where $s_K$ is one of the four samples selected for interpolation (selected as a function of n), and i is the phase being calculated, the filter coefficients $a_K(i)$ being different depending on the phase being generated.

52. A system according to claim 51 further adapted to perform the interpolation by:

precomputing all possible values of $V_1$ and $V_2$ in $s(n,i) = (a_1^{(i)} s_1 + a_2^{(i)} s_2) + (a_3^{(i)} s_3 + a_4^{(i)} s_4) = V_1 + V_2$ and storing these in look-up tables, with two tables per phase.

53. A system according to claim 52 further adapted to perform interpolation by:

processing the first two samples of the four consecutive samples by a selected one of four look-up tables 1A 1B, 1C 1D;

processing the next two samples of the four consecutive samples by a selected one of four look-up tables 2A, 2B, 2C, 2D;

combining the results from the two selected look-up tables to give the interpolated sample.

54. A system according to claim 52 further adapted to perform interpolation by:

reversing the order of the samples for odd phases;

processing the first two samples of the four consecutive samples by a selected one of two look-up tables 1A, 1B;

processing the next two samples of the four consecutive samples by a selected one of two look-up tables 2A, 2B;

combining the results from the two selected look-up tables to give the interpolated sample.

\* \* \* \* \*

UNITED STATES PATENT AND TRADEMARK OFFICE
CERTIFICATE OF CORRECTION

Page 1 of 3

PATENT NO.        : 7,801,085 B1
APPLICATION NO.   : 10/452585
DATED             : September 21, 2010
INVENTOR(S)       : Chen et al.

It is certified that error appears in the above-identified patent and that said Letters Patent is hereby corrected as shown below:

On the Title Page, in Item (56), under "OTHER PUBLICATIONS", in Column 2, Line 2, delete "Infratructure"," and insert -- Infrastructure", --, therefor.

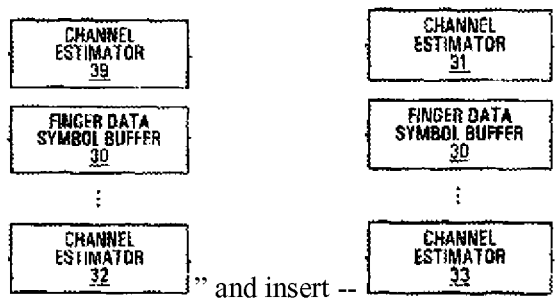

In Fig. 1, Sheet 1 of 10, delete " [CHANNEL ESTIMATOR 32] " and insert -- [CHANNEL ESTIMATOR 33] --, therefor.

In Column 1, Line 66, delete "power," and insert -- power --, therefor.

In Column 2, Line 26, delete "of a" and insert -- of: a --, therefor.

In Column 3, Line 27, delete "$a_\kappa(i)$" and insert -- $a_\kappa^{(i)}$ --, therefor.

In Column 3, Line 31, delete "$s_4$ and" and insert -- $s_4)=V_1+V_2$ and --, therefor.

In Column 3, Line 33, delete "comprises;" and insert -- comprises: --, therefor.

In Column 3, Line 35, delete "1C 1D;" and insert -- 1C, 1D; --, therefor.

In Column 3, Line 60, delete "$a_\kappa(i)$" and insert -- $a_\kappa^{(i)}$ --, therefor.

In Column 6, Line 34, delete "delay," and insert -- delay --, therefor.

In Column 7, Line 6, delete "$f_c$," and insert -- $2f_c$, --, therefor.

Signed and Sealed this
Third Day of July, 2012

David J. Kappos
*Director of the United States Patent and Trademark Office*

CERTIFICATE OF CORRECTION (continued)

U.S. Pat. No. 7,801,085 B1

In Column 7, Line 25, delete "$a_k(i)$" and insert -- $a_k^{(i)}$ --, therefor.

In Column 7, Line 34, delete "1C 1D;" and insert -- 1C, 1D; --, therefor.

In Column 9, Line 19, delete "FN" and insert -- PN --, therefor.

In Column 9, Line 24, delete "generator," and insert -- generator --, therefor.

In Column 12, Line 26, in (EQ1), delete "(antenna)=691.2 Kbits" and insert -- (antennas)=691.2 Kbits --, therefor.

In Column 13, Line 56, delete "1C 1D" and insert -- 1C, 1D --, therefor.

In Column 13, Line 59, delete "$b_1$," and insert -- $b_1$ --, therefor.

In Column 14, Line 27, delete "table 18" and insert -- table 1B --, therefor.

In Column 16, Line 2, delete "samplers" and insert -- samples --, therefor.

In Column 21, Line 1, delete "Spreading" and insert -- spreading --, therefor.

In Column 21, Line 2, delete "Combined" and insert -- combined --, therefor.

In Column 23, Line 21, in Claim 13, delete "$a_k(i)$" and insert -- $a_k^{(i)}$ --, therefor.

In Column 23, Line 24, in Claim 14, delete "$V_l$" and insert -- $V_1$ --, therefor.

In Column 23, Line 25, in Claim 14, delete "$a(_4^{(i)}s_4)$" and insert -- $a_4^{(i)}s_4$) --, therefor.

In Column 23, Line 30, in Claim 15, delete "1C 1D;" and insert -- 1C, 1D; --, therefor.

In Column 23, Line 36, in Claim 16, delete "comprising;" and insert -- comprising: --, therefor.

In Column 23, Line 57, in Claim 17, delete "$a_k(i)$" and insert -- $a_k^{(i)}$ --, therefor.

In Column 24, Line 5, in Claim 20, delete "time" and insert -- time, --, therefor.

In Column 24, Line 13, in Claim 20, delete "delay):" and insert -- delay); --, therefor.

In Column 24, Line 24, in Claim 20, delete "de-spreading:" and insert -- de-spreading; --, therefor.

In Column 24, Line 61, in Claim 29, delete "is chip," and insert -- is 1 chip, --, therefor.

In Column 25, Line 25, in Claim 35, delete "method system" and insert -- method --, therefor.

CERTIFICATE OF CORRECTION (continued)
U.S. Pat. No. 7,801,085 B1

In Column 26, Line 4, in Claim 40, delete "code:" and insert -- code; --, therefor.

In Column 28, Line 12, in Claim 51, delete "$a_\kappa(i)$" and insert -- $a_\kappa^{(i)}$ --, therefor.

In Column 28, Line 23, in Claim 53, delete "1C 1D;" and insert -- 1C, 1D; --, therefor.